(12) United States Patent
Boesner

(10) Patent No.: US 10,625,196 B2
(45) Date of Patent: Apr. 21, 2020

(54) COALESCING FILTER MEDIA

(71) Applicant: Hollingsworth & Vose Company, East Walpole, MA (US)

(72) Inventor: Jens-Peter Boesner, Hatzfeld (DE)

(73) Assignee: Hollingsworth & Vose Company, East Walpole, MA (US)

( * ) Notice: Subject to any disclaimer, the term of this patent is extended or adjusted under 35 U.S.C. 154(b) by 532 days.

(21) Appl. No.: 15/168,709

(22) Filed: May 31, 2016

(65) Prior Publication Data

US 2017/0341006 A1  Nov. 30, 2017

(51) Int. Cl.
*B01D 39/18* (2006.01)
*B01D 46/00* (2006.01)
(Continued)

(52) U.S. Cl.
CPC ....... *B01D 46/528* (2013.01); *B01D 39/1623* (2013.01); *B01D 39/18* (2013.01);
(Continued)

(58) Field of Classification Search
CPC .... B01D 2239/0478; B01D 2239/0654; B01D 2239/0695; B01D 2239/08;
(Continued)

(56) References Cited

U.S. PATENT DOCUMENTS

| | | |
|---|---|---|
| 3,645,398 A | 2/1972 | Fiocco |
| 3,847,821 A | 11/1974 | Krueger |

(Continued)

FOREIGN PATENT DOCUMENTS

| | | |
|---|---|---|
| CA | 2821528 A1 | 5/2006 |
| CN | 1044290 A | 8/1990 |

(Continued)

OTHER PUBLICATIONS

International Search Report and Written Opinion for PCT/US17/35226 dated Aug. 24, 2017.

*Primary Examiner* — Cabrena Holecek
(74) *Attorney, Agent, or Firm* — Wolf, Greenfield & Sacks, P.C.

(57) ABSTRACT

Filter media, filter elements, and methods for filtering an gas stream are described herein. In some embodiments, the filter media may comprise a fiber web comprising a plurality of fibers and having a particular oil repellency level. For instance, in certain embodiments, the surface chemistry of the fiber web may be tailored to impart a particular surface energy density that matches the surface energy density of the fluid (e.g., an oil, a lubricant, and/or a cooling agent) being removed from the gas stream. In some embodiments, the fiber web may be wrapped around a core. For example, the fiber web may be wrapped around the core such that it forms two or more layers around the core. In some cases, the fiber web may be perforated. In certain embodiments, an gas stream comprising a fluid (e.g., an oil, a lubricant, and/or a cooling agent) may be passed through the fiber web, filter media, and/or filter element such that at least a portion of the fluid coalesces on the fiber web. Fiber webs, filter media, and/or filter elements as described herein may be particularly well-suited for applications that involve filtering gas streams containing oil, lubricants, and/or cooling agents (e.g., gas streams generated by a compressor) though the media may also be used in other applications. Advantageously, the fiber webs, filter media, and/or filter elements described herein may significantly reduce or prevent fouling of the filter caused by oil or other liquids.

10 Claims, 6 Drawing Sheets

(51) Int. Cl.
*B01D 46/52* (2006.01)
*B01D 39/20* (2006.01)
*B01D 39/16* (2006.01)

(52) U.S. Cl.
CPC ..... *B01D 39/2017* (2013.01); *B01D 46/0001* (2013.01); *B01D 46/521* (2013.01); B01D 46/003 (2013.01); B01D 2239/0421 (2013.01); B01D 2239/0478 (2013.01); B01D 2239/0654 (2013.01); B01D 2239/0695 (2013.01); B01D 2239/08 (2013.01); B01D 2239/1233 (2013.01); B01D 2239/1258 (2013.01); B01D 2239/1291 (2013.01); B01D 2275/105 (2013.01); B01D 2279/30 (2013.01)

(58) Field of Classification Search
CPC .... B01D 2239/1233; B01D 2239/1258; B01D 2239/1291; B01D 2275/105; B01D 2279/30; B01D 39/18; B01D 46/0001; B01D 46/003; B01D 46/521; B01D 46/528
See application file for complete search history.

(56) References Cited

U.S. PATENT DOCUMENTS

| | | |
|---|---|---|
| 3,865,732 A | 2/1975 | Terhune et al. |
| 3,943,063 A | 3/1976 | Morishita et al. |
| 3,951,814 A | 4/1976 | Krueger |
| 4,199,447 A | 4/1980 | Chambers et al. |
| 4,468,428 A | 8/1984 | Early et al. |
| 4,501,785 A | 2/1985 | Nakanishi |
| 4,588,500 A | 5/1986 | Sprenger et al. |
| 4,604,205 A | 8/1986 | Ayers |
| 4,618,388 A | 10/1986 | Ayers |
| 4,623,560 A | 11/1986 | Ayers |
| 4,650,506 A | 3/1987 | Barris et al. |
| 4,888,117 A | 12/1989 | Brown et al. |
| 4,892,667 A | 1/1990 | Parker, III et al. |
| 4,921,612 A | 5/1990 | Sirkar |
| 4,995,974 A | 2/1991 | Lorey et al. |
| 5,053,132 A | 10/1991 | Sirkar |
| 5,156,905 A | 10/1992 | Bagrodia et al. |
| 5,269,925 A | 12/1993 | Broadhurst |
| 5,275,859 A | 1/1994 | Phillips et al. |
| 5,294,338 A | 3/1994 | Kamo et al. |
| 5,356,704 A | 10/1994 | Phillips et al. |
| 5,443,724 A | 8/1995 | Williamson et al. |
| 5,480,547 A | 1/1996 | Williamson et al. |
| 5,503,746 A | 4/1996 | Gagnon |
| 5,547,756 A | 8/1996 | Kamo et al. |
| 5,580,459 A | 12/1996 | Powers et al. |
| 5,580,692 A | 12/1996 | Lofftus et al. |
| 5,629,367 A | 5/1997 | Lofftus et al. |
| 5,672,399 A | 9/1997 | Kahlbaugh et al. |
| 5,785,725 A | 7/1998 | Cusick et al. |
| 6,123,752 A | 9/2000 | Wu et al. |
| 6,171,684 B1 | 1/2001 | Kahlbaugh et al. |
| 6,224,768 B1 | 5/2001 | Navarre et al. |
| 6,284,843 B1 * | 9/2001 | Jariwala ............... C07C 323/52 525/276 |
| 6,352,947 B1 | 3/2002 | Haley et al. |
| 6,395,184 B1 | 5/2002 | Bukhtiyarov et al. |
| 6,422,395 B1 | 7/2002 | Verdegan et al. |
| 6,422,396 B1 | 7/2002 | Li et al. |
| 6,537,614 B1 | 3/2003 | Wei et al. |
| 6,554,881 B1 | 4/2003 | Healey |
| 6,569,330 B1 | 5/2003 | Sprenger et al. |
| 6,616,723 B2 | 9/2003 | Berger |
| 6,696,373 B2 | 2/2004 | Kinn et al. |
| 6,743,273 B2 | 6/2004 | Chung et al. |
| 6,802,315 B2 | 10/2004 | Gahan et al. |
| 6,855,173 B2 | 2/2005 | Ehrnsperger et al. |
| 6,914,040 B2 | 7/2005 | Deak et al. |
| 6,924,028 B2 | 8/2005 | Chung et al. |
| 6,942,711 B2 | 9/2005 | Faulkner et al. |
| 6,955,775 B2 | 10/2005 | Chung et al. |
| 7,008,465 B2 | 3/2006 | Graham et al. |
| 7,070,640 B2 | 7/2006 | Chung et al. |
| 7,084,099 B2 | 8/2006 | Radomyselski et al. |
| 7,090,715 B2 | 8/2006 | Chung et al. |
| 7,137,510 B1 | 11/2006 | Klein et al. |
| 7,179,317 B2 | 2/2007 | Chung et al. |
| 7,241,728 B2 | 7/2007 | Radomyselski et al. |
| 7,244,291 B2 | 7/2007 | Spartz et al. |
| 7,258,797 B2 | 8/2007 | Burton et al. |
| 7,270,693 B2 | 9/2007 | Chung et al. |
| 7,309,372 B2 | 12/2007 | Kahlbaugh et al. |
| 7,314,497 B2 | 1/2008 | Kahlbaugh et al. |
| 7,316,723 B2 | 1/2008 | Chung et al. |
| 7,318,852 B2 | 1/2008 | Chung et al. |
| 7,318,853 B2 | 1/2008 | Chung et al. |
| 7,326,272 B2 | 2/2008 | Hornfeck et al. |
| 7,413,657 B1 | 8/2008 | Thundyil et al. |
| 7,527,739 B2 | 5/2009 | Jiang et al. |
| 7,584,860 B2 | 9/2009 | Olson |
| 7,754,123 B2 | 7/2010 | Verdegan et al. |
| 7,824,550 B2 | 11/2010 | Abreu et al. |
| 7,887,704 B2 | 2/2011 | Jiang et al. |
| 7,938,963 B2 | 5/2011 | Klein et al. |
| 7,985,344 B2 | 7/2011 | Dema et al. |
| 7,987,996 B2 | 8/2011 | Ohashi et al. |
| 7,988,860 B2 | 8/2011 | Kalayci et al. |
| 8,017,011 B2 | 9/2011 | Ellis et al. |
| 8,021,455 B2 | 9/2011 | Adamek et al. |
| 8,021,457 B2 | 9/2011 | Dema et al. |
| 8,029,588 B2 | 10/2011 | Chung et al. |
| 8,057,567 B2 | 11/2011 | Webb et al. |
| 8,114,183 B2 | 2/2012 | Schwandt et al. |
| 8,118,901 B2 | 2/2012 | Chung et al. |
| 8,118,910 B2 | 2/2012 | Farzana et al. |
| 8,172,092 B2 | 5/2012 | Green et al. |
| 8,177,984 B2 | 5/2012 | Stanfel et al. |
| 8,263,214 B2 | 9/2012 | Kalayci et al. |
| 8,268,033 B2 | 9/2012 | Rogers et al. |
| 8,277,529 B2 | 10/2012 | Rogers et al. |
| 8,360,251 B2 | 1/2013 | Wieczorek et al. |
| 8,366,797 B2 | 2/2013 | Chung et al. |
| 8,517,185 B2 | 8/2013 | Wieczorek et al. |
| 8,535,404 B2 | 9/2013 | Crabtree et al. |
| 8,556,089 B2 * | 10/2013 | Kalayci ............... B01D 39/1623 210/503 |
| 8,636,833 B2 | 1/2014 | Jones et al. |
| 8,641,796 B2 | 2/2014 | Rogers et al. |
| 8,956,437 B2 | 2/2015 | Sealey et al. |
| 9,149,748 B2 | 10/2015 | Nagy et al. |
| 9,149,749 B2 | 10/2015 | Nagy et al. |
| 2002/0056684 A1 | 5/2002 | Klein |
| 2002/0073849 A1 | 6/2002 | Buettner et al. |
| 2003/0203696 A1 | 10/2003 | Healey |
| 2005/0026526 A1 | 2/2005 | Verdegan et al. |
| 2006/0117730 A1 | 6/2006 | Chung et al. |
| 2006/0137318 A1 | 6/2006 | Lim et al. |
| 2006/0191249 A1 | 8/2006 | Gogins et al. |
| 2006/0207234 A1 | 9/2006 | Ward et al. |
| 2007/0012007 A1 | 1/2007 | Chung et al. |
| 2007/0039300 A1 | 2/2007 | Kahlbaugh et al. |
| 2007/0062887 A1 | 3/2007 | Schwandt et al. |
| 2007/0084776 A1 | 4/2007 | Sasur |
| 2007/0102372 A1 | 5/2007 | Ferrer et al. |
| 2007/0271883 A1 | 11/2007 | Chung et al. |
| 2007/0271891 A1 | 11/2007 | Chung et al. |
| 2007/0283808 A1 | 12/2007 | Chung et al. |
| 2008/0033106 A1 | 2/2008 | Koroskenyi et al. |
| 2008/0073296 A1 | 3/2008 | Dema et al. |
| 2008/0110822 A1 | 5/2008 | Chung et al. |
| 2008/0197070 A1 | 8/2008 | Sirkar et al. |
| 2008/0257153 A1 | 10/2008 | Harp |
| 2008/0276805 A1 | 11/2008 | Lotgerink |
| 2008/0314821 A1 | 12/2008 | Ohashi et al. |
| 2009/0032475 A1 | 2/2009 | Ferrer et al. |
| 2009/0044702 A1 | 2/2009 | Adamek et al. |
| 2009/0050578 A1 | 2/2009 | Israel et al. |

(56) References Cited

U.S. PATENT DOCUMENTS

| | | |
|---|---|---|
| 2009/0065436 A1 | 3/2009 | Kalayci et al. |
| 2009/0134068 A1 | 5/2009 | Falkiner et al. |
| 2009/0178970 A1 | 7/2009 | Stanfel et al. |
| 2009/0317621 A1 | 12/2009 | Youngblood et al. |
| 2010/0006494 A1 | 1/2010 | Scher et al. |
| 2010/0050871 A1 | 3/2010 | Moy et al. |
| 2010/0064645 A1 | 3/2010 | Chung et al. |
| 2010/0116138 A1 | 5/2010 | Guimond et al. |
| 2010/0116751 A1 | 5/2010 | Bajpai et al. |
| 2010/0200512 A1 | 8/2010 | Chase et al. |
| 2010/0206800 A1 | 8/2010 | Veit et al. |
| 2010/0285101 A1 | 11/2010 | Moore et al. |
| 2010/0307119 A1 | 12/2010 | Leung et al. |
| 2011/0006017 A1 | 1/2011 | Wieczorek et al. |
| 2011/0067369 A1 | 3/2011 | Chung et al. |
| 2011/0084028 A1 | 4/2011 | Stanfel et al. |
| 2011/0089101 A1 | 4/2011 | Girondi |
| 2011/0124941 A1 | 5/2011 | Verdegan et al. |
| 2011/0138685 A1 | 6/2011 | Kalayci et al. |
| 2011/0147299 A1 | 6/2011 | Stanfel et al. |
| 2011/0147976 A1 | 6/2011 | Wertz et al. |
| 2011/0168622 A1 | 7/2011 | Lucas |
| 2011/0168647 A1 | 7/2011 | Wieczorek et al. |
| 2011/0198280 A1 | 8/2011 | Jones et al. |
| 2011/0209619 A1 | 9/2011 | Lazarevic et al. |
| 2011/0210061 A1 | 9/2011 | Li et al. |
| 2011/0215046 A1 | 9/2011 | Rogers et al. |
| 2011/0233152 A1 | 9/2011 | Wieczorek et al. |
| 2011/0238026 A1 | 9/2011 | Zhang et al. |
| 2011/0259796 A1 | 10/2011 | Chen et al. |
| 2011/0259813 A1 | 10/2011 | Wertz et al. |
| 2011/0309012 A1 | 12/2011 | Rogers et al. |
| 2012/0043281 A1 | 2/2012 | Stanfel et al. |
| 2012/0067220 A1 | 3/2012 | Velpari et al. |
| 2012/0067814 A1 | 3/2012 | Guimond et al. |
| 2012/0091072 A1 | 4/2012 | Kozlov et al. |
| 2012/0177888 A1 | 7/2012 | Escafere et al. |
| 2012/0204527 A1 | 8/2012 | Chung et al. |
| 2012/0234748 A1 | 9/2012 | Little et al. |
| 2012/0248034 A1 | 10/2012 | Segit et al. |
| 2012/0261330 A1 | 10/2012 | Stanfel et al. |
| 2012/0261358 A1 | 10/2012 | Stanfel et al. |
| 2012/0292252 A1 | 11/2012 | Chase et al. |
| 2012/0312734 A1 | 12/2012 | Kalayci et al. |
| 2012/0312738 A1 | 12/2012 | Rogers et al. |
| 2012/0318754 A1 | 12/2012 | Cox et al. |
| 2013/0001154 A1 | 1/2013 | Chung et al. |
| 2013/0001155 A1 | 1/2013 | Neubauer et al. |
| 2013/0008006 A1 | 1/2013 | Israel et al. |
| 2013/0008846 A1 | 1/2013 | Rogers et al. |
| 2013/0008853 A1 | 1/2013 | Dallas et al. |
| 2013/0029048 A1 | 1/2013 | Goscha et al. |
| 2013/0092622 A1 | 4/2013 | Kas et al. |
| 2013/0118973 A1 | 5/2013 | Seo et al. |
| 2013/0264276 A1 | 10/2013 | Corn et al. |
| 2013/0276416 A1 | 10/2013 | Schook |
| 2013/0340613 A1 | 12/2013 | Krupnikov et al. |
| 2013/0341290 A1 | 12/2013 | Yu et al. |
| 2014/0034580 A1 | 2/2014 | Chen |
| 2014/0044756 A1 | 2/2014 | Woon-Fong et al. |
| 2014/0110354 A1 | 4/2014 | Haberkamp et al. |
| 2014/0116945 A1 | 5/2014 | Kas et al. |
| 2014/0130469 A1 | 5/2014 | Nagy et al. |
| 2014/0275692 A1 | 9/2014 | Patel et al. |
| 2014/0284264 A1 | 9/2014 | Klein et al. |
| 2014/0331626 A1 | 11/2014 | Nagy et al. |
| 2015/0182878 A1* | 7/2015 | Bultinck ............. B01D 17/045 95/287 |
| 2015/0252522 A1 | 9/2015 | Setoguchi et al. |
| 2015/0298070 A1 | 10/2015 | Kozlov et al. |
| 2015/0328565 A1 | 11/2015 | Swaminathan et al. |
| 2016/0002484 A1 | 1/2016 | Geisen et al. |
| 2016/0051919 A1 | 2/2016 | Nagy et al. |
| 2016/0059167 A1 | 3/2016 | Nagy et al. |
| 2016/0136554 A1 | 5/2016 | Swaminathan et al. |
| 2016/0166953 A1 | 6/2016 | Swaminathan et al. |
| 2016/0303498 A1 | 10/2016 | Doucoure et al. |
| 2016/0361674 A1 | 12/2016 | Swaminathan et al. |

FOREIGN PATENT DOCUMENTS

| | | | |
|---|---|---|---|
| CN | 2393623 Y | 8/2000 | |
| CN | 1150445 C | 5/2004 | |
| CN | 1954993 A | 5/2007 | |
| CN | 101156998 A | 4/2008 | |
| CN | 101967390 A | 2/2011 | |
| CN | 102046261 A | 5/2011 | |
| CN | 102421583 A | 4/2012 | |
| CN | 101098741 B | 10/2012 | |
| CN | 103025404 A | 4/2013 | |
| DE | 32 15 161 C1 | 12/1983 | |
| DE | 102010031842 A1 | 1/2012 | |
| DE | 102010031843 A1 | 1/2012 | |
| DE | 102012010307 A1 | 11/2013 | |
| EP | 0 203 703 A1 | 12/1986 | |
| EP | 1 201 286 A1 | 5/2002 | |
| EP | 1 254 697 A2 | 11/2002 | |
| EP | 1 194 207 B1 | 8/2004 | |
| GB | 1 039 551 A | 8/1966 | |
| GB | 1 075 575 A | 7/1967 | |
| GB | 1 088 029 A | 10/1967 | |
| GB | 1 107 607 A | 3/1968 | |
| GB | 1 374 290 A | 11/1974 | |
| GB | 1 395 399 A | 5/1975 | |
| GB | 1434598 A * | 5/1976 | ........... B01D 39/083 |
| GB | 1434598 A | 5/1976 | |
| GB | 1 520 495 A | 8/1978 | |
| GB | 2 022 433 A | 12/1979 | |
| GB | 2 078 536 A | 1/1982 | |
| WO | WO 89/03717 A1 | 5/1989 | |
| WO | WO 00/37736 A2 | 6/2000 | |
| WO | WO 01/056678 A1 | 8/2001 | |
| WO | WO 01/73286 A1 | 10/2001 | |
| WO | WO 02/076576 A2 | 10/2002 | |
| WO | WO 03/057345 A1 | 7/2003 | |
| WO | WO 2005/120689 A2 | 12/2005 | |
| WO | WO 2006/071979 A1 | 7/2006 | |
| WO | WO 2006/101992 A2 | 9/2006 | |
| WO | WO 2006/135703 A2 | 12/2006 | |
| WO | WO 2007/041559 A2 | 4/2007 | |
| WO | WO 2008/058243 A2 | 5/2008 | |
| WO | WO 2009/018463 A2 | 2/2009 | |
| WO | WO 2009/042641 A2 | 4/2009 | |
| WO | WO 2009/095339 A1 | 8/2009 | |
| WO | WO 2010/053537 A2 | 5/2010 | |
| WO | WO 2011/101750 A1 | 8/2011 | |
| WO | WO 2012/069338 A1 | 5/2012 | |
| WO | WO 2014/021167 A1 | 2/2014 | |
| WO | WO 2014/060064 A1 | 4/2014 | |
| WO | WO 2014/116946 A1 | 7/2014 | |
| WO | WO 2014/144687 A1 | 9/2014 | |
| WO | WO 2015/036862 A1 | 3/2015 | |

\* cited by examiner

COALESCING FILTER MEDIA

FIELD OF INVENTION

The present embodiments relate generally to coalescing filter media, and specifically, to coalescing filter media having enhanced oil repellency levels and/or performance characteristics, and related methods.

BACKGROUND

Filter elements can be used to remove contamination in a variety of applications. Such elements can include a filter media which may be formed of a web of fibers. The fiber web provides a porous structure that permits fluid (e.g., gas, liquid) to flow through the media. Contaminant particles (e.g., dust particles, soot particles) contained within the fluid may be trapped on or in the fiber web. Depending on the application, the filter media may be designed to have different performance characteristics.

Although many types of filter media for filtering oil from gas streams exist, improvements in the physical and/or performance characteristics of the filter media (e.g., strength, air resistance, efficiency, and high dust holding capacity) would be beneficial.

SUMMARY OF THE INVENTION

Coalescing filter media and related methods are generally provided. The subject matter of this application involves, in some cases, interrelated products, alternative solutions to a particular problem, and/or a plurality of different uses of structures and compositions.

In one aspect, methods for filtering an oil, lubricant, and/or cooling agent from a gas stream are provided. In some embodiments, the method comprises passing the gas stream including the oil, lubricant, and/or cooling agent through a filter element, wherein the filter element comprises a fiber web wrapped around a core such that at least two layers of the fiber web are formed, the fiber web comprising a plurality of fibers having an average fiber diameter of at least 0.01 microns and less than or equal to 50 microns, a basis weight of at least 1 g/m$^2$ and less than or equal to 270 g/m$^2$, and, a thickness of at least 0.01 mm and less than or equal to 5.0 mm, wherein the fiber web has an oil repellency level of between 4 and 6, wherein the fiber web has an oil carry over of less than 20%, and wherein the oil, lubricant, and/or cooling agent has a surface tension of between 22 mN/m and 33 mN/m measured at 23° C. and 50% RH.

In some embodiments, the method comprises passing the gas stream including the oil, lubricant, and/or cooling agent through a fiber web, wherein the fiber web comprises a plurality of fibers having an average fiber diameter of at least 0.01 microns and less than or equal to 50 microns, a basis weight of at least 1 g/m$^2$ and less than or equal to 270 g/m$^2$, and a thickness of at least 0.01mm and less than or equal to 5.0 mm, wherein the fiber web has an oil repellency level of between 4 or greater and 6 or less, and wherein the fiber web comprises a plurality of perforations having an average cross-sectional dimension of at least about 1 mm.

In another aspect, filter elements are provided. In some embodiments, the filter element comprises a core and a fiber web wrapped around the core such that at least two layers of the fiber web are formed, wherein the fiber web comprises a plurality of fibers having an average fiber diameter of at least 0.01 microns and less than or equal to 50 microns, a basis weight of at least 1 g/m$^2$ and less than or equal to 270 g/m$^2$, and a thickness of at least 0.01mm and less than or equal to 5.0 mm, wherein the fiber web has an oil repellency level of between 4 or greater and 6 or less, and wherein the fiber web has an oil carry over of less than 20%.

In yet another aspect, filter media are provided. In some embodiments, the filter media comprises a fiber web, wherein the fiber web comprises a plurality of fibers having an average fiber diameter of at least 0.01 microns and less than or equal to 50 microns, a basis weight of at least 1 g/m$^2$ and less than or equal to 270 g/m$^2$, and a thickness of at least 0.01mm and less than or equal to 5.0 mm, wherein the fiber web has an oil repellency level of between 4 or greater and 6 or less, and wherein the fiber web comprises a plurality of perforations having an average cross-sectional dimension of at least about 1 mm.

Other advantages and novel features of the present invention will become apparent from the following detailed description of various non-limiting embodiments of the invention when considered in conjunction with the accompanying figures. In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Filter media, filter elements, and methods for filtering a gas stream (e.g., air) are described herein. In some embodiments, the filter media may comprise a fiber web comprising a plurality of fibers and having a particular oil repellency level. For instance, in certain embodiments, the surface chemistry of the fiber web may be tailored to impart a particular surface energy density that matches the surface energy density of the fluid (e.g., an oil, a lubricant, and/or a cooling agent) being removed from the gas stream. In some embodiments, the fiber web may be wrapped around a core (e.g., an inner core). For example, the fiber web may be wrapped around the core such that it forms two or more layers around the core. In some cases, the fiber web may be perforated. In certain embodiments, an gas stream comprising a fluid (e.g., an oil, a lubricant, and/or a cooling agent) may be passed through the fiber web, filter media, and/or filter element such that at least a portion of the fluid coalesces on the fiber web. Fiber webs, filter media, and/or filter elements as described herein may be particularly well-suited for applications that involve filtering gas streams containing oil, lubricants, and/or cooling agents (e.g., gas streams generated by a compressor) though the media may also be used in other applications. Advantageously, the fiber webs, filter media, and/or filter elements described herein may significantly reduce or prevent fouling of the filter caused by oil or other liquids and/or increase the coalescence and/or continuous removal of the oil or other liquids.

Figure 1:
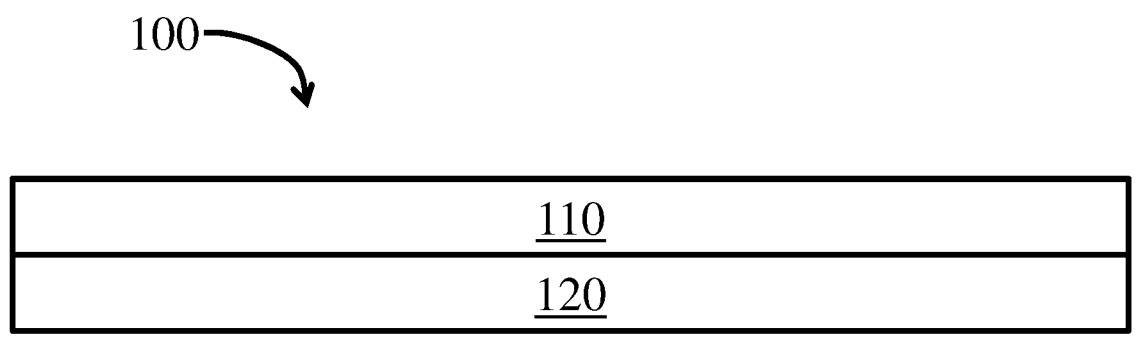
FIG. 1 is a schematic diagram showing a cross-section of a filter media according to one set of embodiments.
Figure 2:
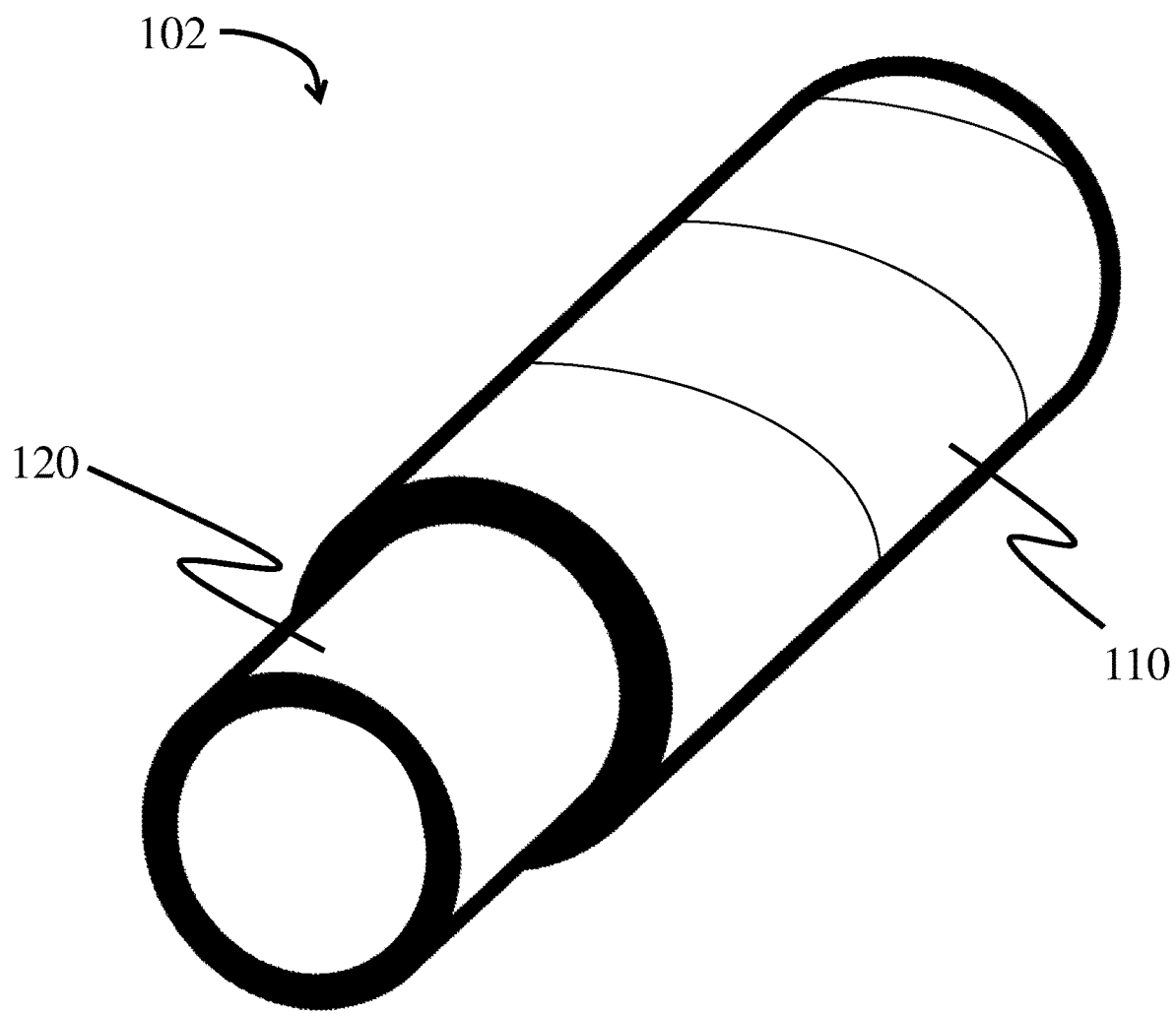
FIG. 2 is a schematic diagram showing a perspective view cross-section of a filter according to one set of embodiments.

An example of a filter element including a fiber web and a core) is shown in FIG. 1. In some embodiments, the fiber web may be adjacent (e.g., directly adjacent) the core. As shown illustratively in FIG. 1, a filter element 100, shown in cross section, may include a fiber web 110 comprising a plurality of fibers and a core 120 directly adjacent fiber web 110. In some embodiments, the fiber web may be wrapped around the core. For example, as shown illustratively in FIG. 2, filter element 102 comprises fiber web 110 wrapped around core 120 (e.g., a non-fibrous component, such as a core). In certain embodiments, the fiber web is wrapped around the core such that the fiber web substantially covers at least a portion of the surface of the core along a circumference of the core. In some embodiments, the fiber web is wrapped two or more times around the core. For example, in certain embodiments, the filter element comprises at least two layers of the fiber web wrapped around the core. The core may comprise, for example, a wire mesh or a perforated sheet, and may be formed of metal or plastic in some embodiments. Additional examples of cores are described in more detail below.

As used herein, when a layer is referred to as being "adjacent" another layer, it can be directly adjacent to the layer, or an intervening layer also may be present. A layer that is "directly adjacent" another layer means that no intervening layer is present.

Figure 3:
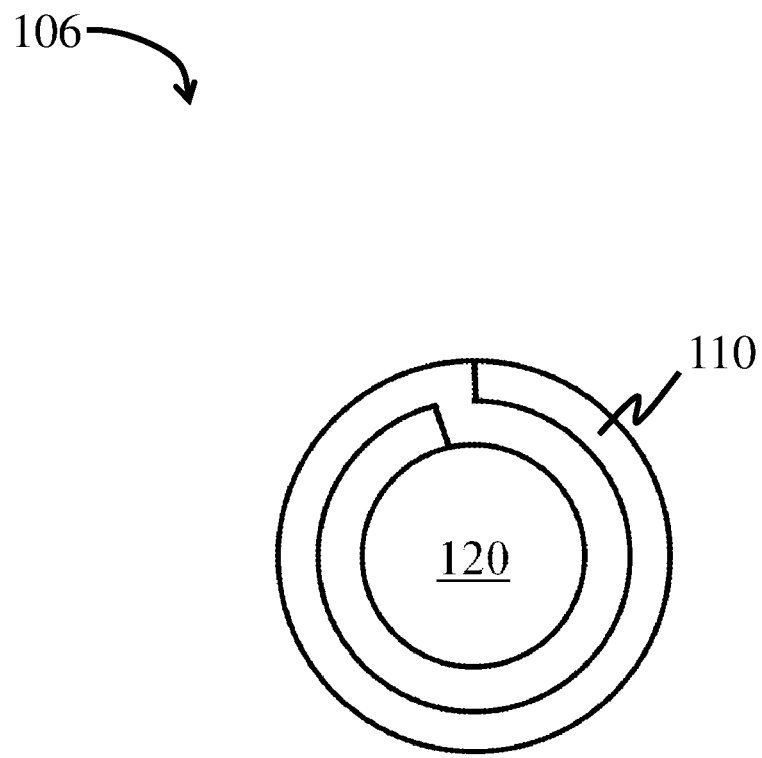
FIG. 3 is a schematic diagram showing a cross-section of a filter according to one set of embodiments.

As shown illustratively in FIG. 3, filter element 106 comprises fiber web 110 wrapped around core 120 such that filter element 106 comprises two layers of fiber web 110. In some embodiments, the fiber web is wrapped continuously around the core. That is to say, in some such embodiments, a single fiber web may be wrapped around the core such that at least one continuous layer is formed. In some embodiments, the single fiber web may be wrapped around the core such that at least two layers of the single fiber web are formed. In some embodiments, the filter element may comprise at least 1, at least 2, at least 3, at least 4, at least 5, at least 7, at least 9, at least 10, at least 11, at least 13, at least 15, at least 17, or at least 19 layers of the single fiber web wrapped around the core. In certain embodiments, the filter element comprises less than or equal to 20, less than or equal to 19, less than or equal to 17, less than or equal to 15, less than or equal to 13, less than or equal to 12, less than or equal to 11, less than or equal to 10, less than or equal to 9, less than or equal to 7, less than or equal to 5, less than or equal to 4, less than or equal to 3, or less than or equal to 2 layers of the single fiber web wrapped around the core. Combinations of the above-referenced ranges are also possible (e.g., at least 1 layer and less than or equal to 20 layers, at least 2 layers and less than or equal to 13 layers, at least 2 layers and less than or equal to 4 layers, at least 5 layers and less than or equal to 10 layers). Other ranges are also possible.

The fiber web may have any suitable configuration with respect to the core. For instance, it should be understood that the fiber web need not wrapped around a core in all embodiments. For example, in certain embodiments, one or more layers comprising the fiber web may be disposed within a core (e.g., an outer core).

Configurations of the fiber web may also vary. For example, in some embodiments, one or more layers comprising the fiber web may be directly adjacent one or more support layers. The support layer may comprising a mesh and/or a plurality of fibers such as synthetic fibers, cellulose fibers, and/or glass fibers as described in more detail below. In some embodiments, a filter element or filter media comprising the fiber web may comprise two or more support layers. The support layer(s) may be positioned upstream and/or downstream of the fiber web layer(s). In some embodiments, the fiber web layer(s) along with the support layer(s), if present, may be wrapped around a core in a filter element. The fiber web may be adhered to the support layer(s) by any suitable means including, for example, by lamination, point bonding, thermo-dot bonding, ultrasonic bonding, calendering, use of adhesives (e.g., glue-web), and/or co-pleating.

In some embodiments, the fiber web layer(s) along with the support layer(s), if present, may be pleated (e.g., co-pleated). In some such embodiments, the pleated layers may be positioned adjacent a core (e.g., wrapped around a core).

The core can have any cross-sectional shape (circular, oval, triangular, irregular, trapezoidal, square or rectangular, or the like). The core may also have an aspect ratio (length to average cross-sectional dimension) of at least 1:1, at least 2:1, more typically at least 3:1, 5:1, or 10:1 or more. The fiber web may at least partially or completely cover the core.

It has been discovered within the context of certain embodiments described herein, that the oil repellency level of the fiber web allows adequate coalescence to be achieved without increasing (or minimally increasing) the resistance of the fiber web and/or the overall filter media. Without wishing to be bound by any theory, it is believed that tailoring the surface chemistry of the fiber web (e.g., by modification of the fiber web and/or choosing appropriate fiber materials) allows the fluid in the gas stream (e.g., the fluid to be separated comprising an oil, lubricant, and/or cooling agent, etc.) to favorably interact with the surface, such that the surface energy density (or surface tension) is changed relative to the surface energy density of fiber web. Having a similar surface energy density between the fluids in the gas stream and the surface of the fiber web causes the fluid to be separated to preferentially associate with (e.g., wetting) the fiber web.

The fiber web may be tailored to have a particular oil repellency level, e.g., in order to coalesce oil, lubricants, and/or cooling agents from an gas stream passed through the fiber web. In some embodiments, the oil repellency level of the fiber web is between 4 and 6 (e.g., 4-6, 4.5-5.5, 4.5-5, 5-5.5). In certain embodiments, the oil repellency level of the fiber web is 4, 4.5, 5, 5.5 or 6. Oil repellency level as described herein is determined according to AATCC TM 118 (1997) measured at 23° C. and 50% relative humidity (RH). Briefly, 5 drops of each test oil (having an average droplet diameter of about 2 mm) are placed on five different locations on the surface of the fiber web. The test oil with the greatest oil surface tension that does not wet (e.g.,. has a contact angle greater than or equal to 90 degrees with the surface) the surface of the fiber web after 30 seconds of contact with the fiber web at 23° C. and 50% RH, corresponds to the oil repellency level (listed in Table 1). For example, if a test oil with a surface tension of 26.6 mN/m does not wet (i.e. has a contact angle of greater than or equal to 90 degrees with the surface) the surface of the fiber web after 30 seconds, but a test oil with a surface tension of 25.4 mN/m wets the surface of the fiber web within thirty seconds, the fiber web has an oil repellency level of 4. By way of another example, if a test oil with a surface tension of 25.4 mN/m does not wet the surface of the fiber web after 30 seconds, but a test oil with a surface tension of 23.8 mN/m wets the surface of the fiber web within thirty seconds, the fiber web has an oil repellency level of 5. By way of yet another example, if a test oil with a surface tension of 23.8 mN/m does not wet the surface of the fiber web after 30 seconds, but a test oil with a surface tension of 21.6 mN/m wets the surface of the fiber web within thirty seconds, the fiber web has an oil repellency level of 6. In some embodiments, if three or more of the five drops partially wet the surface (e.g., forms a droplet, but not a well-rounded drop on the surface) in a given test, then the oil repellency level is expressed to the nearest 0.5 value determined by subtracting 0.5 from the number of the test liquid. By way of example, if a test oil with a surface tension of 25.4 mN/m does not wet the surface of the fiber web after 30 seconds, but a test oil with a surface tension of 23.8 mN/m only partially wets the surface of the fiber web after 30 seconds (e.g., three or more of the test droplets form droplets on the surface of the fiber web that are not well-rounded droplets) within thirty seconds, the fiber web has an oil repellency level of 5.5.

TABLE 1

| Oil Repellency Level | Test Oil | Surface tension (in mN/m) |
|---|---|---|
| 1 | Kaydol (mineral oil) | 31 |
| 2 | 65/35 Kaydol/n-hexadecane | 28 |
| 3 | n-hexadecane | 27.5 |
| 4 | n-tetradecane | 26.6 |
| 5 | n-dodecane | 25.4 |
| 6 | n-decane | 23.8 |
| 7 | n-octane | 21.6 |
| 8 | n-heptane | 20.1 |

In some embodiments, as described in more detail below, the fiber web may be used to decrease oil carry over of a filter media and/or filter element. Briefly, oil carry over provides a measurement of oil that is present in an gas stream comprising the oil, after the gas stream has passed through the fiber web. The decreased oil carry over may be achieved, in some embodiments, by tailoring the surface chemistry of the fiber web (e.g., by surface modification of a surface of the fiber web and/or by choosing a particular surface chemistry of the plurality of fibers) to allow at least one surface of the fiber web to interact with one or more components (e.g., oil, lubricant, and/or cooling agents) in the gas stream. The oil carry over may also be enhanced by the fiber web being wrapped at least two times around a core. In certain embodiments, the choice of surface chemistry (e.g., surface modification), fiber diameter, mean flow pore size, and/or permeability of the fiber web may cause the fluid to be to coalesced into droplets that may be easily separated from the gas stream. In some embodiments, the fiber web as described herein may be particularly well suited for removing droplets of oil having a surface tension between 22 mN/m and 33 mN/m measured at 23° C. and 50% RH by the Du Noüy ring method from an gas stream. In certain embodiments, the fiber web may be particularly well suited for removing droplets having relatively small diameters from the gas stream.

In certain embodiments, the filter media or filter element described herein do not require separate stages of filter media, wherein each stage serves a different purpose such as particle separation, coalescence, and/or shedding. For example, a single filter media can include one or more layers of fiber web that perform two or more of these functions (particle separation, coalescence, and/or shedding). However, in other embodiments, different stages of media may be included.

In some embodiments, the fiber web and/or a plurality of fibers within the fiber web may be modified to alter and/or enhance the wettability of at least one surface of the fiber web with respect to a particular fluid (e.g., oil). For instance, in some embodiments, the surface modification may alter and/or enhance the hydrophilicity and/or lipophilicity of at least one surface of the fiber web. In one example, a surface of a relatively lipophobic (or oleophobic) fiber web may be modified with a lipophilic material (e.g., charged material, non-charged lipophilic material, organic lipophilic material), such that the modified surface is lipophilic. In some such cases, the fiber web may have a modified lipophilic surface (e.g., upstream surface) and an unmodified lipophobic surface (e.g., downstream surface). In other cases, the upstream and downstream surfaces of the fiber web may be modified to be lipophilic. Alternatively, in certain embodiments, a surface of a relatively lipophilic fiber web may be modified with a lipophobic material, such that the modified surface is lipophobic.

In certain embodiments, both the upstream and the downstream surfaces of a fiber web are modified. In other embodiments, the entire fiber web is modified. Although other surface modification techniques can be used, in certain embodiments, a layer is modified using chemical vapor deposition. For instance, the fiber web may comprise a chemical vapor deposition coating.

Regardless of whether the surface is modified to lipophilic or lipophobic, in general, at least one surface of the fiber web may be modified to be wetting toward the fluid to be separated. In some embodiments, at least one surface of the fiber web may be modified to enhance its wettability with respect to a particular fluid.

In some embodiments, the fiber web may serve to decrease the overall oil carry over of the filter media and/or a filter element comprising the fiber web. For instance, the fiber web may be configured to effectively coalesce the fluid to be separated such that the filter media and/or a filter element may achieve a particular oil carry over. Oil carry over, as described herein, is measured according to ISO 12500 on a 6×10 cm fiber web with a 20 cm/s face velocity and a temperature of 40° C., using a Shell Corona S2 P100 test oil at a concentration of 0.2 g/m³. In certain embodiments, the fiber web has an oil carry over of less than or equal to 5000 mg/m³, less than or equal to 4000 mg/m³, less than or equal to 3000 mg/m³, less than or equal to 2500 mg/m³, less than or equal to 2000 mg/m³, less than or equal to 1500 mg/m³, less than or equal to 1000 mg/m³, less than or equal to 500 mg/m³, less than or equal to 250 mg/m³, or less than or equal to 100 mg/m³. In some embodiments, the fiber web has an oil carry over of greater than or equal to 0 mg/m³, greater than or equal to 100 mg/m³, greater than or equal to 250 mg/m³, greater than or equal to 500 mg/m³, greater than or equal to 1000 mg/m³, greater than or equal to 1500 mg/m³, greater than or equal to 2000 mg/m³, greater than or equal to 2500 mg/m³, greater than or equal to 3000 mg/m³, or greater than or equal to 4000 mg/m³. Combinations of the above-referenced ranges are also possible (e.g., greater than or equal to 0 mg/m³ and less than or equal to 5000 mg/m³). Other ranges of oil carry over are also possible.

In certain embodiments, a fiber web described herein has an oil carry over percentage of less than 20%. Oil carry over percentage, as described herein, is a measurement of oil that is present in an gas stream comprising the oil, after the gas stream has passed through the fiber web, as a percentage of total oil present in the gas stream prior to passing through the fiber web. The oil carry over percentage is determined by measuring oil carry over values as described above. In some embodiments, the fiber web has an oil carry over percentage of less than or equal to 20%, less than or equal to 15%, less than or equal to 10%, less than or equal to 5%, less than or equal to 3%, less than or equal to 2%, or less than or equal to 1%. In certain embodiments, the fiber web has an oil carry over percentage of greater than or equal to 0%, greater than or equal to 1%, greater than or equal to 2%, greater than or equal to 3%, greater than or equal to 5%, greater than or equal to 10%, or greater than or equal to 15%. Combinations of the above-referenced ranges are also possible (e.g., less than or equal to 20% and greater than or equal to 0%, less than or equal to 3% and greater than or equal to 0%). Other values of oil carry over percentage are also possible.

Figure 4:
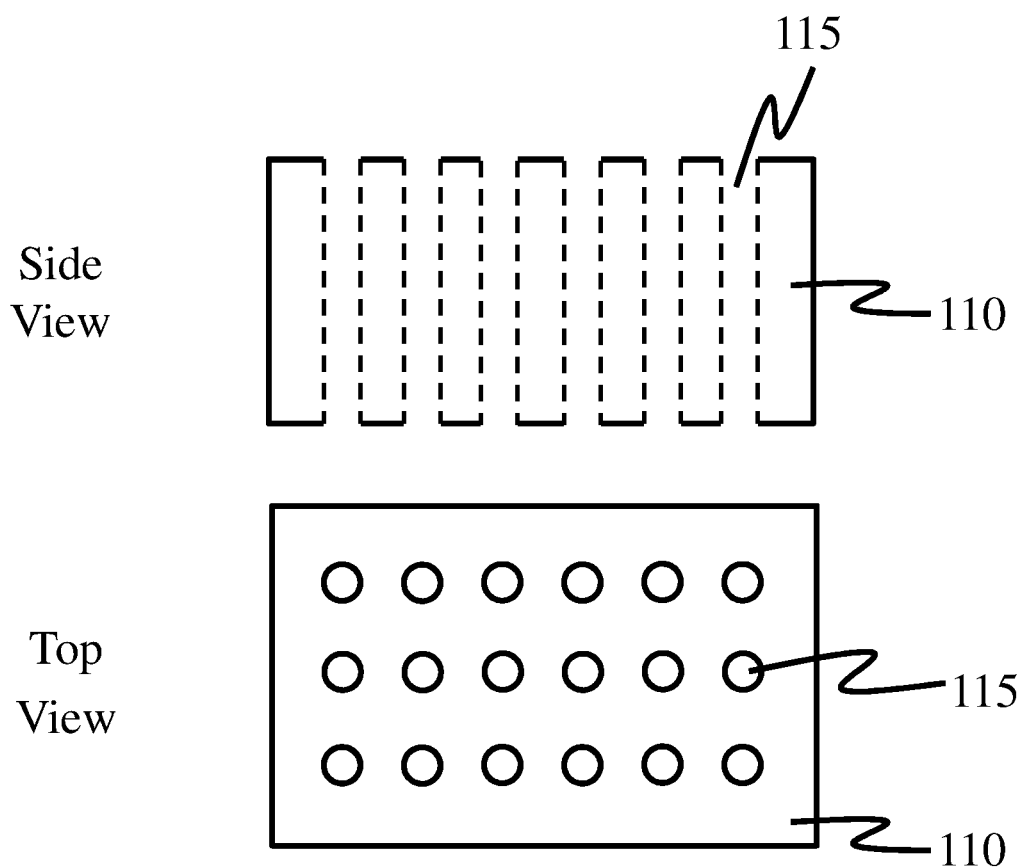
FIG. 4 is a schematic diagram showing a cross-section of a filter media according to one set of embodiments.

In some embodiments, the fiber web may be perforated, i.e the fiber web may comprise a plurality of perforations. In certain embodiments the fiber web may include a plurality of perforations as shown illustratively in FIG. 4. The perforations may, in some embodiments, reduce the overall pressure drop of the filter media/filter element and/or impart a relatively high air permeability while allowing the fiber web to maintain good oil coalescence characteristics. When multiple layers are present, the perforations may be positioned such that perforations between adjacent layers of fiber web do not align, e.g., when layered on a planar surface or wrapped around a core. While much of the description herein relates to a fiber web wrapped around a core, in some embodiments, a filter element or filter media comprises a perforated fiber web without a core. However, in alternative embodiments, the perforated fiber web may be wrapped around a core, as described above.

In some embodiments, perforating a fiber web may result in a plurality of holes through the full thickness of the fiber web. In one embodiment, a plurality of perforations, as shown illustratively in a cross-section of fiber web 110 in FIG. 4, may define a plurality of perforations or holes 115. In certain embodiments, a perforation may have defined attributes, such as shape, size, aspect ratio, length, and/or width. For example, each perforation in the plurality of perforations may have a defined shape, which may be, for example, substantially circular, square, rectangular, trapezoidal, polygonal or oval in cross-section and/or in plane view (i.e., viewed from above). The shapes may be regular or irregular. Other shapes are also possible.

In some instances, the average largest cross-sectional dimension of the perforations (e.g., average diameter of the holes) may be measured at a surface of the fiber web including the perforations. For instance, in some embodiments, the average largest cross-sectional dimension (e.g., diameter) may be greater than or equal to about 1 mm, greater than or equal to about 2 mm, greater than or equal to about 3 mm, greater than or equal to about 6 mm, greater than or equal to about 10 mm, greater than or equal to about 20 mm, greater than or equal to about 40 mm, greater than or equal to about 60 mm, greater than or equal to about 80 mm, or greater than or equal to about 90 mm. In certain embodiments, the average largest cross-sectional dimension may be less than or equal to about 100 mm, less than or equal to about 90 mm, less than or equal to about 80 mm, less than or equal to about 60 mm, less than or equal to about 40 mm, less than or equal to about 20 mm, less than or equal to about 10 mm, less than or equal to about 6 mm, less than or equal to about 3 mm, or less than or equal to about 2 mm. Combinations of the above-referenced ranges are also possible (e.g., greater than or equal to about 1 mm and less than or equal to about 100 mm, greater than or equal to about 6 mm and less than or equal to about 60 mm.). Other values of average largest cross-sectional dimensions of the perforations are also possible. Those skilled in the art would be capable of selecting a suitable method for determining the average largest cross-sectional dimension of the perforations including, for example, taking the average of at least 10 perforation largest cross-sectional dimensions measured using a handheld micrometer.

The perforations may also be characterized by the surface area coverage of the perforations (e.g., as a percentage of the surface area of the fiber web comprising perforations). In certain embodiments, the perforations may cover a certain percentage of the surface area of a layer (i.e., the combined surface area of the perforations as a percentage of the total area of the layer as measured by its length times width). For instance, in some embodiments, the perforations may cover greater than or equal to about 0%, greater than or equal to about 1%, greater than or equal to about 2%, greater than or equal to about 5%, greater than or equal to about 8%, greater than or equal to about 10%, greater than or equal to about 15%, greater than or equal to about 20%, greater than or equal to about 25%, greater than or equal to about 30%, or greater than or equal to about 40% of the surface area of the layer. In some instances, perforations may cover less than or equal to about 50%, less than or equal to about 40%, less than or equal to about 30%, less than or equal to about 25%, less than or equal to about 20%, less than or equal to about 15%, less than or equal to about 10%, less than or equal to about 5%, less than or equal to about 2%, or less than or equal to about 1% of the surface area of the layer. Combinations of the above-referenced ranges are also possible (e.g., greater than or equal to about 0% and less than or equal to about 50%, greater than or equal to about 2% and less than or equal to about 10%). Other ranges of coverage are also possible.

In embodiments, the perforations may be arranged such that a defined periodicity (i.e., distance between the geometric centers of neighboring perforations) and/or pattern exists in the layer. The periodicity may be measured in the machine direction and/or in the cross direction. In some embodiments, the perforations may have an average periodicity of greater than or equal to about 2 mm, greater than or equal to about 5 mm, greater than or equal to about 10 mm, greater than or equal to about 12 mm, greater than or equal to about 15 mm, greater than or equal to about 20 mm, or greater than or equal to about 28 mm. In some instances, the perforations may have an average periodicity of less than or equal to about 30 mm, less than or equal to about 22 mm, less than or equal to about 18 mm, less than or equal to about 14 mm, less than or equal to about 10 mm, or less than or equal to about 6 mm. Combinations of the above-referenced ranges are also possible (e.g., greater than or equal to about 5 mm and less than or equal to about 20 mm). Other values of average periodicity are also possible.

In some embodiments, the periodicity of the perforations may be regular across the layer. In other embodiments, the periodicity of the perforations may be irregular and/or may vary based on a certain factors, such as location in the layer or the pattern of the perforations. In certain embodiments, the plurality of perforations may be arranged to form a pattern (e.g., simple, checkerboard, honeycomb, cubic, hexagonal, polygonal).

In general, any suitable pattern can be used to achieve the desired properties. It should be noted, however, that the plurality of perforations may not have a defined pattern and/or periodicity in some embodiments.

In general the plurality of perforations may be formed by any suitable process. For instance, for a dry web, a plurality of perforations may be formed by a thermo-mechanical process (e.g., thermo-dot bonder, needle punch perforation) or a mechanical process (e.g., puncture or hydro-entangling). For a wet web, for example, a plurality of perforations may be formed by using a perforating Dandy-roll or by hydro-entangling. In a thermo-dot bonder, a thermo-mechanical element applies heat and force to a fiber web to create perforations. Puncture and Dandy roll processes involve the application of mechanical force on a wet layer during drying to make the perforations. Hydro-entangling makes perforations in a fiber web through the application of hydro-mechanical force on a wet or dry layer. In some cases, the application of thermal energy (e.g., a laser) can be used to form perforations. Those skilled in the art would be capable of selecting other suitable means for perforating a fiber web based upon the teachings of the specification including, for example, stamping, cutting, and introducing the perforations during production. Other means are also possible.

In some embodiments, it should be understood that the fiber web need not include any perforations.

Figure 5:
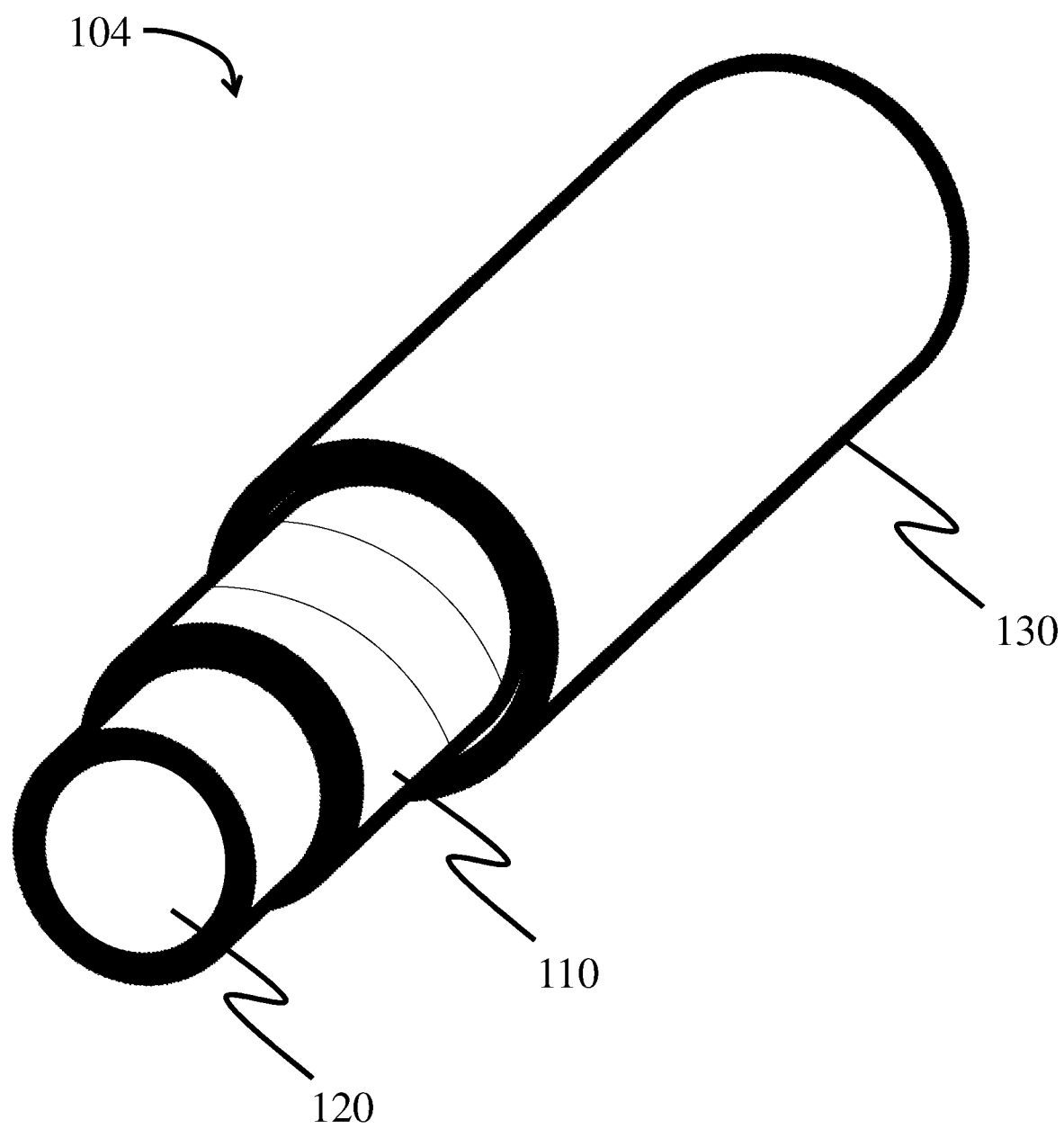
FIG. 5 is a schematic diagram showing a perspective view cross-section of a filter according to one set of embodiments.

In some embodiments, the filter element comprises one or more additional layers (e.g., a support layer). For example, as illustrated in FIG. 5, filter element 104 comprises fiber web 110 wrapped around core 120 (e.g., such that the fiber web forms at least two layers around the core) and an additional layer 130 directly adjacent (e.g., wrapped around) fiber web 110. In some embodiments, as illustrated in FIG. 5, the additional layer may be wrapped around the fiber web (e.g., an outer surface of the fiber web). In other embodiments, however, the one or more additional layers may be in contact with, but not wrapped around, the fiber web.

Figure 6:
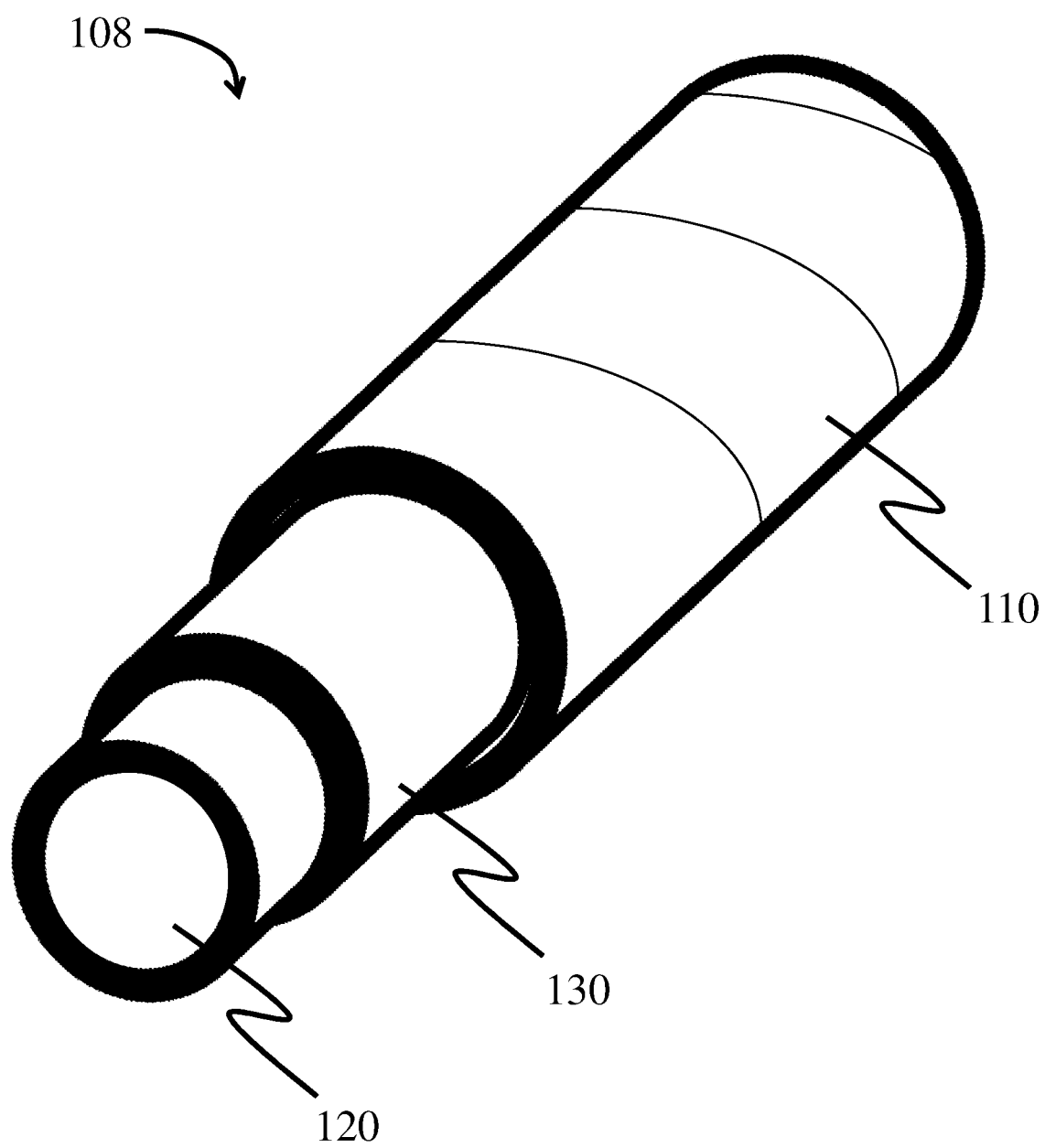
FIG. 6 is a schematic diagram showing a perspective view cross-section of a filter according to one set of embodiments.

In some embodiments, the one or more additional layers may be disposed between the core and the fiber web. For example, as illustrated in FIG. 6, filter element 108 comprises additional layer 130 (e.g., a support layer) directly adjacent (e.g., wrapped around) core 120. In some such embodiments, fiber web 110 may be wrapped around additional layer 130.

In some embodiments, the filter element may comprise at least 1, at least 2, at least 3, at least 4, at least 5, at least 7, at least 9, at least 10, at least 11, at least 13, at least 15, at least 17, or at least 19 layers of the support layer wrapped around the fiber web and/or wrapped around the core. In certain embodiments, the filter element comprises less than or equal to 20, less than or equal to 19, less than or equal to 17, less than or equal to 15, less than or equal to 13, less than or equal to 13, less than or equal to 11, less than or equal to 10, less than or equal to 9, less than or equal to 7, less than or equal to 5, less than or equal to 4, less than or equal to 3, or less than or equal to 2 layers of the support layer wrapped around the fiber web and/or wrapped around the core. Combinations of the above-referenced ranges are also possible (e.g., at least 1 layer and less than or equal to 20 layers, at least 2 layers and less than or equal to 13 layers, at least 2 layers and less than or equal to 4 layers, at least 5 layers and less than or equal to 10 layers). Other ranges are also possible.

In other embodiments, the filter element may comprise at least 1, at least 2, at least 3, at least 4, at least 5, at least 7, at least 9, at least 10, at least 11, at least 13, at least 15, at least 17, or at least 19 layers of the fiber web wrapped around a support layer and/or wrapped around a core. In certain embodiments, the filter element comprises less than or equal to 20, less than or equal to 19, less than or equal to 17, less than or equal to 15, less than or equal to 13, less than or equal to 13, less than or equal to 11, less than or equal to 10, less than or equal to 9, less than or equal to 7, less than or equal to 5, less than or equal to 4, less than or equal to 3, or less than or equal to 2 layers of the fiber web wrapped around the support layer and/or wrapped around the core. Combinations of the above-referenced ranges are also possible (e.g., at least 1 layer and less than or equal to 20 layers, at least 2 layers and less than or equal to 13 layers, at least 2 layers and less than or equal to 4 layers, at least 5 layers and less than or equal to 10 layers). Other ranges are also possible.

In an alternative embodiment, the filter element does not comprise a core. For example, the fiber web may be, in some embodiments, cast and wrapped around a removable core (e.g., a sieve) such that the filter element comprises at least two layers of the fiber web wrapped around itself.

In certain embodiments, one or more additional layers directly adjacent the fiber web may facilitate the drainage of a fluid (e.g., an oil) from the fiber web.

As described herein, in some embodiments, an gas stream comprising the fluid (e.g., comprising an oil, lubricant, and/or cooling agent) is filtered using a filter media/filter element described herein by passing the gas stream including the oil, lubricant, and/or cooling agent through the fiber web (or through a filter element comprising the fiber web, optionally wrapped around a core).

In some embodiments, a filter media or filter element described herein is tailored for filtering a fluid (e.g., oil, lubricant, and/or cooling agent) having a particular surface tension from an gas stream. For example, the fiber webs described herein (e.g., having an oil repellency level of between 4 to 6) may be well suited for filtration of oils, lubricants, cooling agents or other fluids having a surface tension of greater than or equal to 22 mN/m and less than or equal to 33 mN/m at 23° C. and 50% RH (or greater than or equal to 23.8 mN/m and less than or equal to 26.6 mN/m). In some embodiments, the fluid (e.g., the fluid present in the gas stream) has a surface tension of greater than or equal to 22 mN/m, greater than or equal to 24 mN/m, greater than or equal to 26 mN/m, greater than or equal to 28 mN/m, greater than or equal to 30 mN/m, or greater than or equal to 32 mN/m as determined at 23° C. and 50% RH by the Du Noüy ring method. In certain embodiments, the fluid has a surface tension of less than or equal to 33 mN/m, less than or equal to 32 mN/m, less than or equal to 30 mN/m, less than or equal to 28 mN/m, less than or equal to 26 mN/m, or less than or equal to 24 mN/m as determined at 23° C. and 50% RH by the Du Noüy ring method. Combinations of the above-referenced ranges are also possible (e.g., greater than or equal to 22 mN/m and less than or equal to 33 mN/m). Other surface tensions of the fluid determined at 23° C. and 50% RH are also possible.

In some embodiments, the fluid (e.g., the fluid present in the gas stream to be filtered by the fiber web, filter element, and/or filter media) has a surface tension of greater than or equal to 23.8 mN/m, greater than or equal to 24 mN/m, greater than or equal to 24.5 mN/m, greater than or equal to 25 mN/m, greater than or equal to 25.5 mN/m, greater than or equal to 26 mN/m, or greater than or equal to 26.5 mN/m as determined at the filtration temperature by the Du Noüy ring method. In certain embodiments, the fluid has a surface tension of less than or equal to 26.6 mN/m, less than or equal to 26.5 mN/m, less than or equal to 26 mN/m, less than or equal to 25.5 mN/m, less than or equal to 25 mN/m, less than or equal to 24.5 mN/m, or less than or equal to 24 mN/m as determined at the filtration temperature by the Du Noüy ring method. Combinations of the above-referenced ranges are also possible (e.g., greater than or equal to 23.8 mN/m and less than or equal to 26.6 mN/m). Other surface tensions of the fluid determined at the filtration temperature are also possible.

The filtration temperature, as used herein, generally refers the temperature of the gas stream comprising the fluid that is being filtered by a filter element, filter media, and/or fiber web described herein. In some embodiments, the filtration temperature is greater than or equal to 40° C., greater than or equal to 50° C., greater than or equal to 60° C., greater than or equal to 70° C., greater than or equal to 80° C., greater than or equal to 90° C., greater than or equal to 100° C. greater than or equal to 110° C., greater than or equal to 120° C., greater than or equal to 130° C., or greater than or equal to 140° C. In certain embodiments, the filtration temperature is less than or equal to 150° C., less than or equal to 140° C., less than or equal to 130° C., less than or equal to 120° C., less than or equal to 110° C., less than or equal to 100° C., less than or equal to 90° C., less than or equal to 80° C., less than or equal to 70° C., less than or equal to 60° C., or less than or equal to 50° C. Combinations of the above-referenced ranges are also possible (e.g., greater than or equal to 70° C. and less than or equal to 150° C., greater than or equal to 40° C. and less than or equal to 150° C.). Other filtration temperatures are also possible.

Non-limiting examples of fluids that may be filtered (e.g., coalesced) by the fiber webs (or filter elements comprising the fiber webs) described herein include oils, lubricants, cooling agents, and combinations thereof. Non-limiting examples of oils/lubricants that may be filtered (e.g., coalesced) by the fiber webs described herein include alkanes (e.g., n-heptane, n-octane, n-decane, n-dodecane, n-etradecane, n-hexadecane), polyphenyl ethers (e.g., four-ring polyphenyl ethers, five-ring polyphenyl ethers, modified polyphenyl ethers), glycols and derivatives thereof, paraffinic oils, mineral oil (e.g., naphthenic mineral oils, paraffinic mineral oils) fluorosilicones, fluorinated polyethers, glycerol, castor oil, and combinations thereof. Those skilled in the art would understand based upon the teachings of this specification that these examples are not intended to be limiting and that additional oils, lubricants, cooling agents, and combinations thereof are also possible. For example, the oils, lubricants, cooling agents, and combinations thereof may include engine oils, liquid compounds of natural and refined gas, fractions of distillation columns with liquid and/or gas mixtures, food-based oils, liquid and gas streams from fracking, droplets of mercury and its alloys, polymer/oligomer/monomer droplets (e.g., in the ventilation of chemical plants), condensed liquid from exhaust systems, or the like. As described above, in some embodiments, the fluid to be filtered by the fiber webs described herein have a particular surface tension (e.g., between 22 mN/m and 33 mN/m at 23° C. at 50% RH).

In some embodiments, the fiber web may include glass fibers (e.g., microglass fibers, chopped strand glass fibers, or a combination thereof). Microglass fibers and chopped strand glass fibers are known to those skilled in the art. One skilled in the art is able to determine whether a glass fiber is microglass or chopped strand by observation (e.g., optical microscopy, electron microscopy). Microglass fibers may also have chemical differences from chopped strand glass fibers. In some cases, though not required, chopped strand glass fibers may contain a greater content of calcium or sodium than microglass fibers. For example, chopped strand glass fibers may be close to alkali free with high calcium oxide and alumina content. Microglass fibers may contain 10-15% alkali (e.g., sodium, magnesium oxides) and have relatively lower melting and processing temperatures. The terms refer to the technique(s) used to manufacture the glass fibers. Such techniques impart the glass fibers with certain characteristics. In general, chopped strand glass fibers are drawn from bushing tips and cut into fibers in a process similar to textile production. Chopped strand glass fibers are produced in a more controlled manner than microglass fibers, and as a result, chopped strand glass fibers will generally have less variation in fiber diameter and length than microglass fibers. Chopped strand diameters tend to follow a normal distribution. Though, it can be appreciated that chopped strand glass fibers may be provided in any appropriate average diameter distribution (e.g., Gaussian distribution). Microglass fibers are drawn from bushing tips and further subjected to flame blowing or rotary spinning processes. In some cases, fine microglass fibers may be made using a remelting process. In this respect, microglass fibers may be fine or coarse. As used herein, fine microglass fibers are less than or equal to 1 micron in diameter and coarse microglass fibers are greater than or equal to 1 micron in diameter.

In some embodiments, the average diameter of the glass fibers may be greater than or equal to about 0.01 microns, greater than or equal to about 0.1 microns, greater than or equal to about 0.4 microns, greater than or equal to about 0.5 microns, greater than or equal to about 1 micron, greater than or equal to about 2 microns, greater than or equal to about 5 microns, greater than or equal to about 10 microns, greater than or equal to about 15 microns, greater than or equal to about 20 microns, greater than or equal to about 30 microns, or greater than or equal to about 40 microns. In some instances, the glass fibers may have an average fiber diameter of less than or equal to about 50 microns, less than or equal to about 40 microns, less than or equal to about 30 microns, less than or equal to about 25 microns, less than or equal to about 20 microns, less than or equal to about 15 microns, less than or equal to about 10 microns, less than or equal to about 5 microns, less than or equal to about 2 microns, less than or equal to about 1 micron, less than or equal to about 0.5 microns, less than or equal to about 0.4 microns, or less than or equal to about 0.1 microns. Combinations of the above-referenced ranges are also possible (e.g., greater than or equal to about 0.01 microns and less than or equal to about 50 microns, greater than or equal to about 0.4 microns and less than or equal to about 10 microns). Other values of average fiber diameter are also possible. In some embodiments, glass fibers may have a length in the range of between about 0.05 mm and about 50 mm. In some embodiments, the average length of the glass fibers may be less than or equal to about 50 mm, less than or equal to about 40 mm, less than or equal to about 30 mm, less than or equal to about 25 mm, less than or equal to about 20 mm, less than or equal to about 10 mm, less than or equal to about 5 mm, less than or equal to about 1 mm, less than or equal to about 0.5 mm, less than or equal to about 0.3 mm, or less than or equal to about 0.1 mm. In certain embodiments, the average length of the glass fibers may be greater than or equal to about 0.05 mm, greater than or equal to about 0.1 mm, greater than or equal to about 0.3 mm, greater than or equal to about 0.5 mm, greater than or equal to about 1 mm, greater than or equal to about 5 mm, greater than or equal to about 10 mm, greater than or equal to about 20 mm, greater than or equal to about 25 mm, greater than or equal to about 30 mm, or greater than or equal to about 40 mm. Combinations of the above-referenced ranges are also possible (e.g., greater than or equal to about 0.05 mm and less than or equal to about 50 mm, greater than or equal to about 0.3 mm and less than or equal to about 20 mm). Other values of average length are also possible.

It should be appreciated that the above-noted dimensions are not limiting and that the microglass and/or chopped strand fibers, as well as the other fibers described herein, may also have other dimensions.

In some embodiments, the fiber web (and/or one or more additional layers, such as support layers) in the filter media may include synthetic fibers. Synthetic fibers may include any suitable type of synthetic polymer. Examples of suitable synthetic fibers include staple fibers, polyesters (e.g., polyethylene terephthalate, polybutylene terephthalate), polycarbonate, polyamides (e.g., various nylon polymers), polyaramid (e.g., Kevlar®, Nomex®), polyimide, polyphenylene sulfide, polyphenylene oxide, polyethylene, polypropylene, polyether ether ketone, polyolefin, acrylics, polyvinyl alcohol, regenerated cellulose (e.g., synthetic cellulose such Lyocell, rayon), polyacrylonitriles, polyvinylidene fluoride (PVDF), copolymers of polyethylene and PVDF, polyether sulfones, halogenated polymers, and combinations thereof. In some embodiments, the synthetic fibers are organic polymer fibers. Synthetic fibers may also include multicomponent fibers (i.e., fibers having multiple compositions such as bicomponent fibers). In some cases, synthetic fibers may include meltblown, meltspun, melt electrospun, solvent electrospun, or centrifugal spun fibers, which may be formed of polymers described herein (e.g., polyester, polypropylene). In other cases, synthetic fibers may be electrospun fibers. The fiber web may also include combinations of more than one type of synthetic fiber. It should be understood that other types of synthetic fiber types may also be used.

In some embodiments, the average diameter of the synthetic fibers in the fiber web may be, for example, greater than or equal to about 0.5 microns, greater than or equal to about 0.6 microns, greater than or equal to about 1 micron, greater than or equal to about 2 microns, greater than or equal to about 3 microns, greater than or equal to about 4 microns, greater than or equal to about 6 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the synthetic fibers may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 8 microns, less than or equal to about 6 microns, less than or equal to about 4 microns, less than or equal to about 3 microns, less than or equal to about 2 microns, less than or equal to about 1 micron, or less than or equal to about 0.6 microns. Combinations of the above-referenced ranges are also possible (e.g., greater than or equal to about 0.5 micron and less than or equal to about 50 microns, greater than or equal to about 0.6 microns and less than or equal to about 20 microns). Other values of average fiber diameter are also possible.

In some cases, the synthetic fibers in the fiber web may have an average length of greater than or equal to about 0.25 mm, greater than or equal to about 0.5 mm, greater than or equal to about 1 mm, greater than or equal to about 2 mm, greater than or equal to about 4 mm, greater than or equal to about 6 mm, greater than or equal to about 8 mm, greater than or equal to about 10 mm, greater than or equal to about 15 mm, or greater than or equal to about 20 mm. In some instances, synthetic fibers may have an average length of less than or equal to about 30 mm, less than or equal to about 20 mm, less than or equal to about 15 mm, less than or equal to about 10 mm, less than or equal to about 8 mm, less than or equal to about 6 mm, less than or equal to about 4 mm, less than or equal to about 2 mm, less than or equal to about 1 mm, or less than or equal to about 0.5 mm. Combinations of the above-referenced ranges are also possible (e.g., greater than or equal to about 0.25 mm and less than or equal to about 25 mm, greater than or equal to about 3 mm and less than or equal to about 15 mm). Other values of average fiber length are also possible.

In some embodiments, a filter media, filter element, fiber web and/or one or more additional layers described herein may comprise binder fibers (e.g., bicomponent fibers). The binder fibers can be formed, for example, from any material that is effective to facilitate thermal bonding between the fiber web and the support layer, and will thus have an activation temperature that is lower than the melting temperature of any non-binder fibers. The binder fibers can be monocomponent fibers or any one of a number of bicomponent binder fibers. In one embodiment, the binder fibers can be bicomponent fibers, and each component can have a different melting temperature. For example, the binder fibers can include a core and a sheath where the activation temperature of the sheath is lower than the melting temperature of the core. This allows the sheath to melt prior to the core, such that the sheath binds to other fibers in the layer, while the core maintains its structural integrity. This may be particularly advantageous in that it creates a more cohesive layer for trapping filtrate. The core/sheath binder fibers can be concentric or non-concentric, and exemplary core/sheath binder fibers can include the following: a polyester core/copolyester sheath, a polyester core/polyethylene sheath, a polyester core/polypropylene sheath, a polypropylene core/polyethylene sheath, a polyamide core/polyethylene sheath, and combinations thereof. Other exemplary bicomponent binder fibers can include split fiber fibers, side-by-side fibers, and/or "island in the sea" fibers. In an exemplary embodiment, the binder fiber comprises polyvinylalcohol (e.g., as a dissolving fiber). The binder fibers may comprise a thermoplastic polymer. The average diameter of the binder fibers may be, for example, greater than or equal to about 0.5 microns, greater than or equal to about 0.6 microns, greater than or equal to about 1 micron, greater than or equal to about 2 microns, greater than or equal to about 3 microns, greater than or equal to about 4 microns, greater than or equal to about 6 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the binder fibers may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 8 microns, less than or equal to about 6 microns, less than or equal to about 4 microns, less than or equal to about 3 microns, less than or equal to about 2 microns, less than or equal to about 1 micron, or less than or equal to about 0.6 microns. Combinations of the above-referenced ranges are also possible (e.g., greater than or equal to about 0.5 micron and less than or equal to about 50 microns, greater than or equal to about 0.6 microns and less than or equal to about 20 microns). Other values of average fiber diameter are also possible.

In some cases, the binder fibers in the fiber web may have an average length of greater than or equal to about 0.25 mm, greater than or equal to about 0.5 mm, greater than or equal to about 1 mm, greater than or equal to about 2 mm, greater than or equal to about 4 mm, greater than or equal to about 6 mm, greater than or equal to about 8 mm, greater than or equal to about 10 mm, greater than or equal to about 15 mm, or greater than or equal to about 20 mm. In some instances, binder fibers may have an average length of less than or equal to about 30 mm, less than or equal to about 20 mm, less than or equal to about 15 mm, less than or equal to about 10 mm, less than or equal to about 8 mm, less than or equal to about 6 mm, less than or equal to about 4 mm, less than or equal to about 2 mm, less than or equal to about 1 mm, or less than or equal to about 0.5 mm. Combinations of the above-referenced ranges are also possible (e.g., greater than or equal to about 0.25 mm and less than or equal to about 25 mm, greater than or equal to about 3 mm and less than or equal to about 15 mm). Other values of average fiber length are also possible.

The fiber web may comprise a suitable percentage of binder fibers. For example, in some embodiments, the weight percentage of binder fibers present in the fiber web may be at least about 0 wt %, at least about 2 wt %, at least about 5 wt %, at least about 7 wt %, or at least about 10 wt %. In certain embodiments, the weight percentage of binder fibers present in the fiber web may be less than or equal to about 15 wt %, less than or equal to about 10 wt %, less than or equal to about 7 wt %, less than or equal to about 5 wt %, or less than or equal to about 2 wt %. Combinations of the above-referenced ranges are also possible (e.g., at least about 0 wt % and less than or equal to about 10 wt %). Other ranges are also possible.

In some embodiments, the fiber web may include one or more cellulose fibers, such as softwood fibers, hardwood fibers, a mixture of hardwood and softwood fibers, regenerated cellulose fibers, and mechanical pulp fibers (e.g., groundwood, chemically treated mechanical pulps, and thermomechanical pulps). Exemplary softwood fibers include fibers obtained from mercerized southern pine (e.g., mercerized southern pine fibers or "HPZ fibers"), northern bleached softwood kraft (e.g., fibers obtained from Robur Flash ("Robur Flash fibers")), southern bleached softwood kraft (e.g., fibers obtained from Brunswick pine ("Brunswick pine fibers")), or chemically treated mechanical pulps ("CTMP fibers"). For example, HPZ fibers can be obtained from Buckeye Technologies, Inc., Memphis, Tenn.; Robur Flash fibers can be obtained from Rottneros AB, Stockholm, Sweden; and Brunswick pine fibers can be obtained from Georgia-Pacific, Atlanta, Ga. Exemplary hardwood fibers include fibers obtained from Eucalyptus ("Eucalyptus fibers"). Eucalyptus fibers are commercially available from, e.g., (1) Suzano Group, Suzano, Brazil ("Suzano fibers"), (2) Group Portucel Soporcel, Cacia, Portugal ("Cacia fibers"), (3) Tembec, Inc., Temiscaming, QC, Canada ("Tarascon fibers"), (4) Kartonimex Intercell, Duesseldorf, Germany, ("Acacia fibers"), (5) Mead-Westvaco, Stamford, Conn. ("Westvaco fibers"), and (6) Georgia-Pacific, Atlanta, Ga. ("Leaf River fibers").

The average diameter of the cellulose fibers in the fiber web may be, for example, greater than or equal to about 1 micron, greater than or equal to about 2 microns, greater than or equal to about 3 microns, greater than or equal to about 4 microns, greater than or equal to about 5 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the cellulose fibers may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 7 microns, less than or equal to about 5 microns, less than or equal to about 4 microns, or less than or equal to about 2 microns. Combinations of the above-referenced ranges are also possible (e.g., greater than or equal to about 1 micron and less than or equal to about 5 microns). Other values of average fiber diameter are also possible.

In some embodiments, the cellulose fibers may have an average length. For instance, in some embodiments, cellulose fibers may have an average length of greater than or equal to about 0.5 mm, greater than or equal to about 1 mm, greater than or equal to about 2 mm, greater than or equal to about 3 mm, greater than or equal to about 4 mm, greater than or equal to about 5 mm, greater than or equal to about 6 mm, or greater than or equal to about 8 mm. In some instances, cellulose fibers may have an average length of less than or equal to about 10 mm, less than or equal to about 8 mm, less than or equal to about 6 mm, less than or equal to about 4 mm, less than or equal to about 2 mm, or less than or equal to about 1 mm. Combinations of the above-referenced ranges are also possible (e.g., greater than or equal to about 1 mm and less than or equal to about 3 mm). Other values of average fiber length are also possible.

In general, the fiber web may include any suitable fiber type. In some embodiments, the fiber web may include more than one type of fiber. For example, in certain embodiments, the fiber web may include one or more of a glass fiber, synthetic fiber, a bicomponent fiber, and/or a cellulose fiber (e.g., regenerated, Lyocell, etc.), as described herein.

In some embodiments, the fiber web may include glass fibers (e.g., microglass and/or chopped glass fibers). For instance, in some embodiments, the weight percentage of the glass fibers in the fiber web may be, for example, greater than or equal to about 0%, greater than or equal to about 10%, greater than or equal to about 25%, greater than or equal to about 50%, greater than or equal to about 75%, greater than or equal to about 80%, greater than or equal to about 90%, greater than or equal to about 95%, greater than or equal to about 98%, or greater than or equal to about 99%. In some instances, the weight percentage of the glass fibers in the fiber web may be less than or equal to about 100%, less than or equal to about 75%, less than or equal to about 50%, less than or equal to about 25%, less than or equal to about 5%, or less than or equal to about 2%. Combinations of the above-referenced ranges are also possible (e.g., greater than or equal to about 0% and less than or equal to about 99%). Other values of weight percentage of the glass in the fiber web are also possible. In some embodiments, the fiber web includes 100% glass fibers.

The ratio between the weight percentage of chopped strand glass fibers and microglass fibers provides for different characteristics in the filter media. In general, increasing the percentage of fine glass fibers will increase the overall surface area of the filter media; and, increasing the percentage of coarse glass fibers will decrease the overall surface area of the filter media. Thus, in general, increasing the amount of chopped strand glass fibers as compared to the amount of microglass fibers decreases the overall surface area of the filter media; and, increasing the amount of microglass fibers as compared to the amount of chopped strand glass fibers increases the surface area of the filter media. Increasing the amount of chopped strand glass fibers within the filter media also increases the pleatability of the filter media (i.e., the ability of a filter to be pleated).

The percentage of chopped strand glass fibers and microglass fibers (e.g., coarse and/or fine) within the filter media are selected to provide desired characteristics.

Various percentages of chopped strand glass fibers can be included within the glass fibers in the fiber web. In some embodiments, chopped strand glass fibers may make up less than or equal to about 80% by weight of the glass fiber in the fiber web, less than about 75% by weight of the glass fiber in the fiber web, less than about 50% by weight of the glass fiber in the fiber web, less than about 40% by weight of the glass fiber in the fiber web, less than about 35% by weight of the glass fiber in the fiber web, less than about 25% by weight of the glass fiber in the fiber web, less than about 20% by weight of the glass fiber in the web, or less than about 3% by weight of the glass fiber in the fiber web. In certain embodiments, chopped strand glass fibers may make up greater than about 0% by weight of the glass fiber in the fiber web, greater than about 1% by weight of the glass fiber in the fiber web, greater than about 3% by weight of the glass fiber in the fiber web, greater than about 20% by weight of the glass fiber in the fiber web, greater than about 25% by weight of the glass fiber in the fiber web, greater than about 35% by weight of the glass fiber in the fiber web, greater than about 40% by weight of the glass fiber in the fiber web, greater than about 50% by weight of the glass fiber in the fiber web, or greater than 75% by weight of the glass fiber in the fiber web.

Combinations of the above-referenced ranges are also possible (e.g., between about 1% by weight and about 50% by weight of the glass fibers in the fiber web, between about 3% by weight and about 35% by weight of the glass fibers in the fiber web, or between about 3% by weight and 25% by weight of the glass fibers in the fiber web). In certain embodiments, substantially all of the glass fibers in the fiber web are chopped strand glass fibers.

Additionally, different percentages of microglass fibers are included within the glass fibers within the web. In some embodiments, microglass fibers may make up greater than about 20% by weight of the glass fibers in the fiber web, greater than about 25% by weight of the glass fibers in the fiber web, greater than about 50% by weight of the glass fibers in the fiber web, greater than about 60% by weight of the glass fibers in the fiber web, greater than about 65% by weight of the glass fibers in the fiber web, greater than about 75% by weight of the glass fibers in the fiber web, greater than about 80% by weight of the glass fibers in the fiber web, greater than about 97% by weight of the glass fibers in the fiber web, or greater than about 99% by weight of the glass fibers in the fiber web. In certain embodiments, microglass fibers may make up less than about 100% by weight of the glass fibers in the fiber web, less than about 99% by weight of the glass fibers in the fiber web, less than about 97% by weight of the glass fibers in the fiber web, less than about 80% by weight of the glass fibers in the fiber web, less than about 75% by weight of the glass fibers in the fiber web, less than about 65% by weight of the glass fibers in the fiber web, less than about 60% by weight of the glass fibers in the fiber web, less than about 50% by weight of the glass fibers in the fiber web, less than about 25% by weight of the glass fibers in the fiber web, or less than about 20% by weight of the glass fibers in the fiber web. Combinations of the above-referenced ranges are also possible (e.g., between about 45% by weight and about 97% by weight of the glass fibers in the fiber web). Other ranges are also possible.

Coarse microglass fibers, fine microglass fibers, or a combination of microglass fibers thereof may be included within the glass fibers of the web. For coarse microglass fibers, in some embodiments, coarse microglass fibers may make up greater than or equal to about 40%, greater than or equal to about 50%, greater than or equal to about 60%, greater than or equal to about 70%, greater than or equal to about 75%, or greater than or equal to about 80% by weight of the total glass fibers in the fiber web. In certain embodiments, coarse microglass fibers may make up less than about 90%, less than about 80%, less than about 75%, less than about 70%, less than about 60%, or less than about 50% by weight of the total fibers in the fiber web. Combinations of the above-referenced ranges are also possible (e.g., between about 40% and about 90% by weight of the total fibers in the fiber web, between about 75% and about 90% by weight of the total fibers in the fiber web, or between about 60% and about 70% by weight of the total fibers in the fiber web). Other ranges are also possible.

For fine microglass fibers, in some embodiments, fine microglass fibers make up greater than or equal to about 0%, greater than or equal to about 2%, greater than or equal to about 5%, greater than or equal to about 10%, greater than or equal to about 12%, greater than or equal to about 15% or greater than or equal to about 20% by weight of the total fibers in the fiber web. In certain embodiments, fine microglass fibers make up less than about 25%, less than about 20%, less than about 15%, less than about 12%, less than about 10%, less than about 5%, or less than about 2% by weight of the total fibers in the fiber web. Combinations of the above-referenced ranges are also possible (e.g., between about 0% and about 25% by weight of the totalfibers in the fiber web, between about 5% and about 10% by weight of the totalfibers in the fiber web, or between about 2% and about 12% by weight of the totalfibers in the fiber web). Other ranges are also possible.

In some embodiments in which synthetic fibers are included in the fiber web, the weight percentage of synthetic fibers in the fiber web may be greater than or equal to about 1%, greater than or equal to about 3%, greater than or equal to about 5%, greater than or equal to about 10%, greater than or equal to about 20%, greater than or equal to about 40%, greater than or equal to about 60%, greater than or equal to about 80%, greater than or equal to about 90%, or greater than or equal to about 95%. In some instances, the weight percentage of synthetic fibers in the fiber web may be less than or equal to about 100%, less than or equal to about 98%, less than or equal to about 85%, less than or equal to about 75%, less than or equal to about 50%, less than or equal to about 10%, less than or equal to about 5%, less than or equal to about 3%, or less than or equal to about 1%. Combinations of the above-referenced ranges are also possible (e.g., greater than or equal to about 1% and less than or equal to about 100%, greater than or equal to about 80% and less than or equal to about 100%). Other values of weight percentage of synthetic fibers in the fiber web are also possible. In some embodiments, the fiber web includes 100% synthetic fibers. In other embodiments, the fiber web may include 0% synthetic fibers.

In certain embodiments, the fiber web may optionally include cellulose fibers, such as regenerated cellulose (e.g., rayon, Lyocell), fibrillated synthetic fibers, microfibrillated cellulose, and natural cellulose fibers (e.g., hardwood, softwood). For instance, in some embodiments, the weight percentage of cellulose fibers in the fiber web may be greater than or equal to about 1%, greater than or equal to about 5%, greater than or equal to about 10%, greater than or equal to about 15%, greater than or equal to about 45%, greater than or equal to about 65%, or greater than or equal to about 90%. In some instances, the weight percentage of the cellulose fibers in the fiber web may be less than or equal to about 100%, less than or equal to about 85%, less than or equal to about 55%, less than or equal to about 20%, less than or equal to about 10%, or less than or equal to about 2%. Combinations of the above-referenced ranges are also possible (e.g., greater than or equal to about 1% and less than or equal to about 100%). Other values of weight percentage of the cellulose fibers in the fiber web are also possible. In some embodiments, the fiber web includes 100% cellulose fibers. In other embodiments, the fiber web may include 0% cellulose fibers.

As noted above, in some embodiments at least one surface of the fiber web may be modified such that the fiber web has an oil repellency level of between 4 and 6. In some embodiments, the fiber web may have at least one modified surface. In some embodiments, the fiber web comprises a plurality of fibers wherein at least a portion of the fibers comprise a modified surface. The material used to modify at least one surface of the fiber web and/or fibers may be applied on any suitable portion of the fiber web. In some embodiments, the material may be applied such that one or more surfaces of the fiber web are modified without substantially modifying the interior of the fiber web. In some instances, a single surface of the fiber web may be modified. For example, the upstream surface of the fiber web may be coated. In other instances, more than one surface of the fiber web may be coated (e.g., the upstream and downstream surfaces). In other embodiments, at least a portion of the interior of the fiber web may be modified along with at least one surface of the fiber web. In some embodiments, the entire fiber web is modified with the material.

In general, any suitable method for modifying the surface chemistry of at least one surface of the fiber web and/or the plurality of fibers may be used. In some embodiments, the surface chemistry of the fiber web and/or the plurality of fibers may be modified by coating at least a portion of the surface, using melt-additives, and/or altering the roughness of the surface.

In some embodiments, the surface modification may be a coating. In certain embodiments, a coating process involves introducing resin or a material (e.g., hydrophobic material, hydrophilic material, lipophilic material, lipophobic material) dispersed in a solvent or solvent mixture into a pre-formed fiber layer (e.g., a pre-formed fiber web formed by a meltblown process). Non-limiting examples of coating methods include the use of chemical vapor deposition, a slot die coater, gravure coating, screen coating, size press coating (e.g., a two roll-type or a metering blade type size press coater), film press coating, blade coating, roll-blade coating, air knife coating, roll coating, foam application, reverse roll coating, bar coating, curtain coating, champlex coating, brush coating, Bill-blade coating, short dwell-blade coating, lip coating, gate roll coating, gate roll size press coating, laboratory size press coating, melt coating, dip coating, knife roll coating, spin coating, spray coating, gapped roll coating, roll transfer coating, padding saturant coating, and saturation impregnation. Other coating methods are also possible. In some embodiments, the hydrophilic, hydrophobic, lipophilic, and/or lipophobic material may be applied to the fiber web using a non-compressive coating technique. The non-compressive coating technique may coat the fiber web, while not substantially decreasing the thickness of the web. In other embodiments, the resin may be applied to the fiber web using a compressive coating technique.

In one set of embodiments, a surface described herein is modified using chemical vapor deposition. In chemical vapor deposition, the fiber web is exposed to gaseous reactants from gas or liquid vapor that are deposited onto the fiber web under high energy level excitation such as thermal, microwave, UV, electron beam or plasma. Optionally, a carrier gas such as oxygen, helium, argon and/or nitrogen may be used.

Other vapor deposition methods include atmospheric pressure chemical vapor deposition (APCVD), low pressure chemical vapor deposition (LPCVD), metal-organic chemical vapor deposition (MOCVD), plasma assisted chemical vapor deposition (PACVD) or plasma enhanced chemical vapor deposition (PECVD), laser chemical vapor deposition (LCVD), photochemical vapor deposition (PCVD), chemical vapor infiltration (CVI) and chemical beam epitaxy (CBE).

In physical vapor deposition (PVD) thin films are deposited by the condensation of a vaporized form of the desired film material onto substrate. This method involves physical processes such as high-temperature vacuum evaporation with subsequent condensation, or plasma sputter bombardment rather than a chemical reaction.

After applying the coating to the fiber web, the coating may be dried by any suitable method. Non-limiting examples of drying methods include the use of a photo dryer, infrared dryer, hot air oven steam-heated cylinder, or any suitable type of dryer familiar to those of ordinary skill in the art.

In some embodiments, at least a portion of the fibers of the fiber web may be coated without substantially blocking the pores of the fiber web. In some instances, substantially all of the fibers may be coated without substantially blocking the pores. In some embodiments, the fiber web may be coated with a relatively high weight percentage of resin or material without blocking the pores of the fiber web using the methods described herein (e.g., by dissolving and/or suspending one or more material in a solvent to form the resin).

In some embodiments, the surface may be modified using melt additives. Melt-additives are functional chemicals that are added to thermoplastics fibers during an extrusion process that may render different physical and chemical properties at the surface from those of the thermoplastic itself after formation.

In some embodiments, the material may undergo a chemical reaction (e.g., polymerization) after being applied to the fiber web. For example, a surface of the fiber web may be coated with one or more monomers that can be polymerized after coating. In another example, a surface of the fiber web may include monomers, as a result of the melt additive, that are polymerized after formation of the fiber web. In some such embodiments, an in-line polymerization may be used.

In-line polymerization (e.g., in-line ultraviolet polymerization) is a process to cure a monomer or liquid polymer solution onto a substrate under conditions sufficient to induce polymerization (e.g., under UV irradiation).

In general, any suitable material may be used to alter the surface chemistry, and accordingly the lipophilicity, of the fiber web. In some embodiments, the material may be charged. In some such embodiments, as described in more detail herein, the surface charge of the fiber web may further facilitate coalescence and/or increase the oil carry over. For instance, in certain embodiments, a fiber web having a lipophilic modified surface may have a decreased oil carry over and/or produce larger coalesced droplets than a fiber web having a non-modified surface.

In general, the net charge of the modified surface may be negative, positive, or neutral. In some instances, the modified surface may comprise a negatively charged material and/or a positively charged material. In some embodiments, the surface may be modified with an electrostatically neutral material. Non-limiting examples of materials that may be used to modify the surface include polyelectrolytes (e.g., anionic, cationic), oligomers, polymers (e.g., fluorinated polymers, perfluoroalkyl ethyl methacrylate, polycaprolactone, poly [bis(trifluoroethoxy)phosphazene], small molecules (e.g., carboxylate containing monomers, amine containing monomers, polyol), ionic liquids, monomer precursors, and gases, and combinations thereof.

In embodiments in which fluorinated polymers are included, the polymer may include a species having the formula $-C_nF_{2n+1}$ or $-C_nF_m$, where n is an integer greater than 1, and m is an integer greater than 1 (e.g., $-C_6F_{13}$). In some embodiments, anionic polyelectrolytes may be used to modify the surface of the fiber web. For example, one or more anionic polyelectrolytes may be spray or dip coated onto at least one surface of the fiber web. In some embodiments, cationic polyelectrolytes may be used to modify the surface of the fiber web. In some embodiments, silicone (or derivatives thereof) may be used to modify the surface of the fiber web. For example, in certain embodiments, at least a surface of the fiber web may be treated or coated with polydimethylsiloxane. In certain embodiments, the surface of the fiber web may be silylated (e.g., a substituted silyl group may be incorporated onto at least a surface of the fiber web).

In certain embodiments, a filler material (e.g., an organic filler material, and inorganic filler material) may be added to the fiber web to modify the surface and/or oil repellency level of the fiber web. In some embodiments, small molecules (e.g., monomers, polyol) may be used to modify the oil repellency level of the fiber webIn certain embodiments, small molecules may be used as melt-additives. In another example, small molecules may be deposited on at least one surface of the fiber web via coating (e.g., chemical vapor deposition). Regardless of the modification method, the small molecules on a surface of the fiber web may be polymerized after deposition in some embodiments.

In certain embodiments, the small molecules, such as monobasic carboxylic acids and/or unsaturated dicarboxylic (dibasic) acids, may be used to modify at least one surface of the fiber web. In certain embodiments, the small molecules may be amine containing small molecules. The amine containing small molecules may be primary, secondary, or tertiary amines. In some such cases, the amine containing small molecule may be a monomer. In some embodiments, the small molecule may be an inorganic or organic hydrophobic molecule. Non-limiting examples include hydrocarbons (e.g., $CH_4$, $C_2H_2$, $C_2H_4$, $C_6H_6$), fluorocarbons (e.g., $CF_4$, $C_2F_4$, $C_3F_6$, $C_3F_8$, $C_4H_8$, $C_5H_{12}$, $C_6F_6$, $C_6F_{13}$, or other fluorocarbons having the formula $-C_nF_{2n+1}$ or $-C_nF_m$, where n is an integer greater than 1, and m is an integer greater than 1), silanes (e.g., $SiH_4$, $Si_2H_6$, $Si_3H_8$, $Si_4H_{10}$), organosilanes (e.g., methylsilane, dimethylsilane, triethylsilane), and siloxanes (e.g., dimethylsiloxane, hexamethyldisiloxane). In certain embodiments, suitable hydrocarbons for modifying a surface of the fiber web may have the formula $C_xH_y$, where x is an integer from 1 to 10 and y is an integer from 2 to 22. In certain embodiments, suitable silanes for modifying a surface of the fiber web may have the formula $Si_nH_{2n+2}$ where any hydrogen may be substituted for a halogen (e.g., Cl, F, Br, I), where n is an integer from 1 to 10.

As used herein, "small molecules" refers to molecules, whether naturally-occurring or artificially created (e.g., via chemical synthesis) that have a relatively low molecular weight. Typically, a small molecule is an organic compound (i.e., it contains carbon). The small organic molecule may contain multiple carbon-carbon bonds, stereocenters, and other functional groups (e.g., amines, hydroxyl, carbonyls, and heterocyclic rings, etc.). In certain embodiments, the molecular weight of a small molecule is at most about 1,000 g/mol, at most about 900 g/mol, at most about 800 g/mol, at most about 700 g/mol, at most about 600 g/mol, at most about 500 g/mol, at most about 400 g/mol, at most about 300 g/mol, at most about 200 g/mol, or at most about 100 g/mol. In certain embodiments, the molecular weight of a small molecule is at least about 100 g/mol, at least about 200 g/mol, at least about 300 g/mol, at least about 400 g/mol, at least about 500 g/mol, at least about 600 g/mol, at least about 700 g/mol, at least about 800 g/mol, or at least about 900 g/mol, or at least about 1,000 g/mol. Combinations of the above ranges (e.g., at least about 200 g/mol and at most about 500 g/mol) are also possible.

In some embodiments, polymers may be used to modify at least one surface of the fiber web. For example, one or more polymer may be applied to at least a portion of a surface of the fiber web via a coating technique. In certain embodiments, the polymer may be formed from monobasic carboxylic acids and/or unsaturated dicarboxylic (dibasic) acids. In certain embodiments, the polymer may be a graft copolymer and may be formed by grafting polymers or oligomers to polymers in the fibers and/or fiber web (e.g., resin polymer). The graft polymer or oligomer may comprise carboxyl moieties that can be used to form a chemical bond between the graft and polymers in the fibers and/or fiber web. Non-limiting examples of polymers in the fibers and/or fiber web that can be used to form a graft copolymer include polyethylene, polypropylene, polycarbonate, polyvinyl chloride, polytetrafluoroethylene, polystyrene, cellulose, polyethylene terephthalate, polybutylene terephthalate, and nylon, and combinations thereof. Graft polymerization can be initiated through chemical and/or radiochemical (e.g., electron beam, plasma, corona discharge, UV-irradiation) methods. In some embodiments, the polymer may be a polymer having a repeat unit that comprises an amine (e.g., polyallylamine, polyethyleneimine, polyoxazoline). In certain embodiments, the polymer may be a polyol.

In some embodiments, a gas may be used to modify at least one surface of the fiber web. In some such cases, the molecules in the gas may react with material (e.g., fibers, resin, additives) on the surface of the fiber web to form functional groups, such as charged moieties, and/or to increase the oxygen content on the surface of the fiber web. The weight percent of the material used to modify at least one surface of the fiber web may be greater than or equal to about 0.0001 wt %, greater than or equal to about 0.0005 wt %, greater than or equal to about 0.001 wt %, greater than or equal to about 0.005 wt %, greater than or equal to about 0.01 wt %, greater than or equal to about 0.05 wt %, greater than or equal to about 0.1 wt %, greater than or equal to about 0.5 wt %, greater than or equal to about 1 wt %, greater than or equal to about 2 wt %, or greater than or equal to about 3 wt % of the fiber web. In some cases, the weight percentage of the material used to modify at least one surface of the fiber web may be less than or equal to about 4 wt %, less than or equal to about 3 wt %, less than or equal to about 1 wt %, less than or equal to about 0.5 wt %, less than or equal to about 0.1 wt %, less than or equal to about 0.05 wt %, less than or equal to about 0.01 wt %, or less than or equal to about 0.005 wt % of the fiber web. Combinations of the above-referenced ranges are also possible (e.g., a weight percentage of material of greater than or equal to about 0.0001 wt % and less than about 4 wt %, or greater than or equal to about 0.01 wt % and less than about 0.5 wt %). Other ranges are also possible. The weight percentage of material in the fiber web is based on the dry solids of the fiber web and can be determined by weighing the fiber web before and after the material is applied.

The fiber web, as described herein, may have certain structural characteristics such as basis weight. For instance, in some embodiments, the fiber web may have a basis weight of greater than or equal to about 1 g/m$^2$, greater than or equal to about 5 g/m$^2$, greater than or equal to about 10 g/m$^2$, greater than or equal to about 20 g/m$^2$, greater than or equal to about 27 g/m$^2$, greater than or equal to about 30 g/m$^2$, greater than or equal to about 40 g/m$^2$, greater than or equal to about 50 g/m$^2$, greater than or equal to about 100 g/m$^2$, greater than or equal to about 150 g/m$^2$, greater than or equal to about 200 g/m$^2$, greater than or equal to about 250 g/m$^2$, greater than or equal to about 270 g/m$^2$, greater than or equal to about 300 g/m$^2$, greater than or equal to about 350 g/m$^2$, greater than or equal to about 400 g/m$^2$, or greater than or equal to about 450 g/m$^2$. In certain embodiments, the fiber web may have basis weight of less than or equal to about 500 g/m$^2$, less than or equal to about 450 g/m$^2$, less than or equal to about 400 g/m$^2$, less than or equal to about 350 g/m$^2$, less than or equal to about 300 g/m$^2$, less than or equal to about 270 g/m$^2$, less than or equal to about 250 g/m$^2$, less than or equal to about 200 g/m$^2$, less than or equal to about 150 g/m$^2$, less than or equal to about 100 g/m$^2$, less than or equal to about 50 g/m$^2$, less than or equal to about 40 g/m$^2$, less than or equal to about 30 g/m$^2$, less than or equal to about 27 g/m$^2$, less than or equal to about 25 g/m$^2$, less than or equal to about 20 g/m$^2$, less than or equal to about 10 g/m$^2$, or less than or equal to about 5 g/m$^2$. Combinations of the above-referenced ranges are also possible (e.g., greater than or equal to about 1 g/m$^2$ and less than or equal to about 500 g/m$^2$, greater than or equal to about 20 g/m$^2$ and less than or equal to about 500 g/m$^2$, greater than or equal to about 27 g/m$^2$ and less than or equal to about 270 g/m$^2$). Other values of basis weight are also possible. The basis weight may be determined according to the standard ASTM D-846.

The mean flow pore size may be selected as desired. With respect to the mean flow pore size of a fiber web, whether the fiber web includes perforations or does not include any perforations, the mean flow pore size as used herein is measured in an area of the fiber web that does not include any perforations. In some embodiments, the fiber web may have a mean flow pore size of greater than or equal to about 1 microns, greater than or equal to about 3 microns, greater than or equal to about 4 microns, greater than or equal to about 5 microns, greater than or equal to about 6 microns, greater than or equal to about 7 microns, or greater than or equal to about 9 microns. In some instances, the fiber web may have a mean flow pore size of less than or equal to about 10 microns, less than or equal to about 8 microns, less than or equal to about 6 microns, less than or equal to about 5 microns, less than or equal to about 4 microns, or less than or equal to about 2 microns. Combinations of the above-referenced ranges are also possible (e.g., greater than or equal to about 3 microns and less than or equal to about 6 microns).

Other values of mean flow pore size are also possible. The mean flow pore size may be determined according to the standard ASTM E1294 (2008) (M.F.P.).

The thickness of the fiber web may be selected as desired. For instance, in some embodiments, the fiber web may have a thickness of greater than or equal to about 0.1 mm, greater than or equal to about 0.2 mm, greater than or equal to about 0.3 mm, greater than or equal to about 0.4 mm, greater than or equal to about 0.5 mm, greater than or equal to about 1.0 mm, or greater than or equal to about 1.5 mm. In some instances, the fiber web may have a thickness of less than or equal to about 2.0 mm, less than or equal to about 1.2 mm, less than or equal to about 0.5 mm, less than or equal to about 0.4 mm, less than or equal to about 0.3 mm, or less than or equal to about 0.2 mm. Combinations of the above-referenced ranges are also possible (e.g., a thickness of greater than or equal to about 0.2 mm and less than or equal to about 0.5 mm). Other values of thickness are also possible. The thickness may be determined according to the standard TAPPI T411.

The fiber web (or filter media) described herein may be used for the filtration of various particle sizes. In a typical test for measuring efficiency of a layer or the entire media (e.g., according to the standard ISO 19438), particle counts (particles per milliliter) at the particle size, x, selected (e.g., where x is 1, 3, 4, 5, 7, 10, 15, 20, 25, or 30 microns) upstream and downstream of the layer or media can be taken at ten points equally divided over the time of the test. Generally, a particle size of x means that x micron or greater particles will be captured by the layer or media. The average of upstream and downstream particle counts can be taken at the selected particle size. From the average particle count upstream (injected —$C_0$) and the average particle count downstream (passed thru —C) the filtration efficiency test value for the particle size selected can be determined by the relationship $[(1[C/C_0])*100\%]$. As described herein, efficiency can be measured according to standard ISO 19348. A similar protocol can be used for measuring initial efficiency, which refers to the efficiency measurements of the media at 4 minutes after running the test. Unless otherwise indicated, efficiency and initial efficiency measurements described herein refer to values where x 13 4 microns.

The fiber web (or filter media) may have a relatively high initial efficiency. The initial efficiency of the fiber web may be greater than or equal to about 1%, greater than or equal to about 5%, greater than or equal to about 10%, greater than or equal to about 20%, greater than or equal to about 30%, greater than or equal to about 40%, greater than or equal to about 50%, greater than or equal to about 60%, greater than or equal to about 70%, greater than or equal to about 80%, greater than or equal to about 90%, greater than or equal to about 95%, greater than or equal to about 96%, greater than or equal to about 97%, greater than or equal to about 98%, greater than or equal to about 99%, or greater than or equal to about 99.9%. In some instances, the initial efficiency of the fiber web may be less than or equal to about 99.99%, less than or equal to about 98%, less than or equal to about 97%, less than or equal to about 96%, less than or equal to about 90%, less than or equal to about 80%, less than or equal to about 70%, less than or equal to about 60%, less than or equal to about 50%, less than or equal to about 40%, less than or equal to about 30%, less than or equal to about 20%, less than or equal to about 10%, or less than or equal to about 5%. Combinations of the above-referenced ranges are also possible (e.g., greater than or equal to about 1% and less than or equal to about 99.99%, greater than or equal to about 80% and less than or equal to about 99.99%). Other values of the initial efficiency of the fiber web are also possible.

The air permeability of the fiber web described herein can vary. In some embodiments, the permeability of the fiber web may be, for example, greater than or equal to about 5 L/m²s, greater than or equal to about 10 L/m²s, greater than or equal to about 15 L/m²s, greater than or equal to about 25 L/m²s, greater than or equal to about 50 L/m²s, greater than or equal to about 100 L/m²s, greater than or equal to about 150 L/m²s, greater than or equal to about 200 L/m²s, greater than or equal to about 250 L/m²s, greater than or equal to about 300 L/m²s, greater than or equal to about 500 L/m²s, greater than or equal to about 1000 L/m²s, greater than or equal to about 1500 L/m²s, greater than or equal to about 1700 L/m²s, greater than or equal to about 2000 L/m²s, or greater than or equal to about 2500 L/m²s. In some instances, the air permeability may be, for example, less than or equal to about 3000 L/m²s, less than or equal to about 2500 L/m²s, less than or equal to about 2000 L/m²s, less than or equal to about 1700 L/m²s, less than or equal to about 1500 L/m²s, less than or equal to about 1000 L/m²s, less than or equal to about 500 L/m²s, less than or equal to about 300 L/m²s, less than or equal to about 250 L/m²s, less than or equal to about 200 L/m²s, less than or equal to about 150 L/m²s, less than or equal to about 100 L/m²s, less than or equal to about 50 L/m²s, less than or equal to about 25 L/m²s, less than or equal to about 20 L/m²s, less than or equal to about 15 L/m²s, or less than or equal to about 10 L/m²s. Combinations of the above-referenced ranges are also possible (greater than or equal to about 5 L/m²s and less than or equal to about 3000 L/m²s, greater than or equal to about 15 L/m²s and less than or equal to about 1700 L/m²s). Other ranges of air permeability are also possible. As determined herein, the air permeability is measured according to standard TAPPI T251 (wherein the flow is 10,000 L/m²/s on 20 cm² area). The permeability of a fiber web is an inverse function of flow resistance and can be measured with a Frazier Permeability Tester. The Frazier Permeability Tester measures the volume of air per unit of time that passes through a unit area of media at a fixed differential pressure across the media.

The overall pressure drop of the fiber web may be selected as desired. For instance, in some embodiments, the fiber web may have an overall pressure drop of less than or equal to about 1700 Pa, less than or equal to about 1500 Pa, less than or equal to about 1000 Pa, less than or equal to about 700 Pa, less than or equal to about 500 Pa, less than or equal to about 250 Pa, less than or equal to about 100 Pa, less than or equal to about 50 Pa, less than or equal to about 25 Pa, less than or equal to about 10 Pa, or less than or equal to about 5 Pa. In certain embodiments, the fiber web may have an overall pressure drop of greater than or equal to about 3 Pa, greater than or equal to about 5 Pa, greater than or equal to about 10 Pa, greater than or equal to about 25 Pa, greater than or equal to about 50 Pa, greater than or equal to about 100 Pa, greater than or equal to about 250 Pa, greater than or equal to about 500 Pa, greater than or equal to about 700 Pa, greater than or equal to about 1000 Pa, or greater than or equal to about 1500 Pa. Combinations of the above-referenced ranges are also possible (e.g., greater than or equal to about 3 Pa and less than or equal to about 1700 Pa, greater than or equal to about 10 Pa and less than or equal to about 700 Pa). Other values of pressure drop are also possible. The pressure drop may be measured using the TAPPI T251 standard.

As described herein, in some embodiments a filter element comprises a core. In some embodiments, the core may comprise a plastic and/or metallic net, and/or a mesh. Non-limiting examples of suitable meshes include polymer meshes (e.g., comprising fluoropolymers, polyamides, polyolefins, polyesters, polysulfones, polyvinyls, or combinations thereof) and metal meshes (e.g., comprising stainless steel). In some embodiments, the core comprises a metal sheet (e.g., stainless steel) which may or may not be perforated. In certain embodiments, the core is fibrous. For example, in some embodiments, the core comprises a plurality of synthetic fibers. In some cases, the core may have a specific weight percentage of synthetic fibers.

For instance, in some embodiments, the weight percentage of synthetic fibers in the core may be greater than or equal to about 0%, greater than or equal to about 10%, greater than or equal to about 20%, greater than or equal to about 30%, greater than or equal to about 40%, greater than or equal to about 55%, greater than or equal to about 70%, greater than or equal to about 75%, greater than or equal to about 80%, or greater than or equal to about 90%. In some instances, the weight percentage of synthetic fibers in the core may be less than or equal to about 100%, less than or equal to about 85%, less than or equal to about 75%, less than or equal to about 65%, less than or equal to about 55%, less than or equal to about 45%, less than or equal to about 35%, less than or equal to about 25%, or less than or equal to about 15%. Combinations of the above-referenced ranges are also possible (e.g., greater than or equal to about 0% and less than or equal to about 100%). In some embodiments, 100% of the fibers in the core are synthetic fibers. Other values of weight percentage of the synthetic fibers in the core are also possible.

In some embodiments, the fibers (e.g., synthetic fibers) in the core may have an average diameter of greater than or equal to about 0.5 microns, greater than or equal to about 0.6 microns, greater than or equal to about 1 micron, greater than or equal to about 2 microns, greater than or equal to about 3 microns, greater than or equal to about 4 microns, greater than or equal to about 6 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the fibers in the core may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 8 microns, less than or equal to about 6 microns, less than or equal to about 4 microns, less than or equal to about 3 microns, less than or equal to about 2 microns, less than or equal to about 1 micron, or less than or equal to about 0.6 microns. Combinations of the above-referenced ranges are also possible (e.g., greater than or equal to about 0.5 micron and less than or equal to about 50 microns, greater than or equal to about 0.6 microns and less than or equal to about 20 microns). Other values of average fiber diameter are also possible.

In some embodiments, fibers (e.g., synthetic fibers) in the core may have an average length of greater than or equal to about 1 mm, greater than or equal to about 2 mm, greater than or equal to about 3 mm, greater than or equal to about 4 mm, greater than or equal to about 6 mm, greater than or equal to about 8 mm, greater than or equal to about 10 mm, greater than or equal to about 12 mm, greater than or equal to about 15 mm, greater than or equal to about 20 mm, greater than or equal to about 25 mm, greater than or equal to 30 mm, or greater than or equal to about 40 mm. In some instances, the fibers may have an average length of less than or equal to about 50 mm, less than or equal to about 40 mm, less than or equal to about 30 mm, less than or equal to about 25 mm, less than or equal to about 20 mm, less than or equal to about 15 mm, less than or equal to about 12 mm, less than or equal to about 10 mm, less than or equal to about 8 mm less than or equal to about 7 mm, less than or equal to about 5 mm, less than or equal to about 3 mm, less than or equal to about 2 mm, or less than or equal to about 1.5 mm. Combinations of the above-referenced ranges are also possible (e.g., greater than or equal to about 1 mm and less than or equal to about 50 mm, greater than or equal to about 1 mm and less than or equal to about 15 mm, greater than or equal to about 1.5 mm and less than or equal to about 30 mm,). Other values of average fiber length are also possible.

The core, as described herein, may have certain structural characteristics, such as basis weight, and thickness. For instance, in some embodiments, the core may have a basis weight of greater than or equal to about 3 g/m², greater than or equal to about 10 g/m², greater than or equal to about 22 g/m², greater than or equal to about 25 g/m², greater than or equal to about 30 g/m², greater than or equal to about 33 g/m², greater than or equal to about 40 g/m², greater than or equal to about 50 g/m², greater than or equal to about 60 g/m², greater than or equal to about 70 g/m², greater than or equal to about 80 g/m², greater than or equal to about 100 g/m², greater than or equal to about 200 g/m², greater than or equal to about 300 g/m², or greater than or equal to about 400 g/m². In some instances, the core may have a basis weight of less than or equal to about 500 g/m², less than or equal to about 400 g/m², less than or equal to about 300 g/m², less than or equal to about 200 g/m², less than or equal to about 100 g/m², less than or equal to about 90 g/m², less than or equal to about 80 g/m², less than or equal to about 70 g/m², less than or equal to about 60 g/m², less than or equal to about 50 g/m², less than or equal to about 40 g/m², less than or equal to about 33 g/m², less than or equal to about 30 g/m², or less than or equal to about 25 g/m². Combinations of the above-referenced ranges are also possible (e.g., a basis weight of greater than or equal to about 22 g/m² and less than or equal to about 90 g/m², a basis weight of greater than or equal to about 33 g/m² and less than or equal to about 70 g/m², a basis weight of greater than or equal to about 3 g/m² and less than or equal to about 500 g/m²). Other values of basis weight are also possible. The basis weight may be determined according to the standard ASTM D-846.

The thickness of the core may be selected as desired. For instance, in some embodiments, the core may have a thickness of greater than or equal to about 0.01 mm, greater than or equal to about 0.1 mm, greater than or equal to about 0.2 mm, greater than or equal to about 0.3 mm, greater than or equal to about 0.4 mm, greater than or equal to about 0.5 mm, greater than or equal to about 1.0 mm, greater than or equal to about 1.5 mm, greater than or equal to about 2 mm, greater than or equal to about 3 mm, or greater than or equal to about 4 mm. In some instances, the core may have a thickness of less than or equal to about 5 mm, less than or equal to about 4 mm, less than or equal to about 3 mm, less than or equal to about 2 mm, less than or equal to about 1.2 mm, less than or equal to about 0.5 mm, less than or equal to about 0.4 mm, less than or equal to about 0.3 mm, less than or equal to about 0.2 mm, or less than or equal to about 0.1 mm. Combinations of the above-referenced ranges are also possible (e.g., a thickness of greater than or equal to about 0.01 mm and less than or equal to about 5 mm, a thickness of greater than or equal to about 0.1 mm and less than or equal to about 2 mm). Other values of thickness are also possible. The thickness may be determined according to the standard TAPPI T411.

As described herein, in some embodiments a filter media may include one or more support layers. The support layer(s) may include a plurality of fibers. In general, a number of different materials can be used to form the fibers as described below. In some embodiments, the fibers are made from cellulose. Examples of cellulose fibers are provided above. In certain embodiments, the support layer may include synthetic fibers, as described above. In some cases, the support layer may be a perforated film comprising bio-derived and/or metal materials.

In some cases, the support layer may have a specific weight percentage of synthetic fibers. For instance, in some embodiments, the weight percentage of synthetic fibers in the support layer may be greater than or equal to about 0%, greater than or equal to about 10%, greater than or equal to about 20%, greater than or equal to about 30%, greater than or equal to about 40%, greater than or equal to about 55%, greater than or equal to about 70%, greater than or equal to about 75%, greater than or equal to about 80%, or greater than or equal to about 90%. In some instances, the weight percentage of synthetic fibers in the support layer may be less than or equal to about 100%, less than or equal to about 85%, less than or equal to about 75%, less than or equal to about 65%, less than or equal to about 55%, less than or equal to about 45%, less than or equal to about 35%, less than or equal to about 25%, or less than or equal to about 15%. Combinations of the above-referenced ranges are also possible (e.g., greater than or equal to about 0% and less than or equal to about 100%). In some embodiments, 100% of the fibers in the support layer are synthetic fibers. Other values of weight percentage of the synthetic fibers in the support layer are also possible.

The support layer may include one or more of glass fibers, cellulose fibers, and/or bicomponent fibers, as described above in the context of the fiber web. For instance, in some embodiments, the weight percentage of each of glass fibers, binder fibers, and/or cellulose fibers in the support layer may independently be greater than or equal to about 0%, greater than or equal to about 0.1%, greater than or equal to about 1%, greater than or equal to about 2%, greater than or equal to about 5%, greater than or equal to about 10%, greater than or equal to about 15%, greater than or equal to about 20%, greater than or equal to about 30%, greater than or equal to about 40%, greater than or equal to about 50%, greater than or equal to about 60%, greater than or equal to about 70%, greater than or equal to about 80%, or greater than or equal to about 90%. In some instances, the weight percentage of each of the glass fibers, binder fibers, and/or cellulose fibers in the support layer may independently be less than or equal to about 100%, less than or equal to about 90%, less than or equal to about 80%, less than or equal to about 70%, less than or equal to about 60%, less than or equal to about 50%, less than or equal to about 40%, less than or equal to about 30%, less than or equal to about 20%, less than or equal to about 15%, less than or equal to about 10%, less than or equal to about 5%, less than or equal to about 2%, less than or equal to about 0.5%, or less than or equal to about 0.1%. Combinations of the above-referenced ranges are also possible (e.g., greater than or equal to about 0% and less than or equal to about 20%). Other values of weight percentages of the fibers in the support layer are also possible. Examples of glass fibers, and binder fibers are provided in more detail herein.

In some embodiments, the fibers in the support layer may have an average diameter of greater than or equal to about 0.5 microns, greater than or equal to about 0.6 microns, greater than or equal to about 1 micron, greater than or equal to about 2 microns, greater than or equal to about 3 microns, greater than or equal to about 4 microns, greater than or equal to about 6 microns, greater than or equal to about 8 microns, greater than or equal to about 10 microns, greater than or equal to about 15 microns, greater than or equal to about 20 microns, greater than or equal to about 30 microns, or greater than or equal to about 40 microns. In some instances, the fibers in the support layer may have an average diameter of less than or equal to about 50 microns, less than or equal to about 40 microns, less than or equal to about 30 microns, less than or equal to about 20 microns, less than or equal to about 15 microns, less than or equal to about 10 microns, less than or equal to about 8 microns, less than or equal to about 6 microns, less than or equal to about 4 microns, less than or equal to about 3 microns, less than or equal to about 2 microns, less than or equal to about 1 micron, or less than or equal to about 0.6 microns. Combinations of the above-referenced ranges are also possible (e.g., greater than or equal to about 0.5 micron and less than or equal to about 50 microns, greater than or equal to about 0.6 microns and less than or equal to about 20 microns). Other values of average fiber diameter are also possible.

In some embodiments, fibers in the support layer may have an average length of greater than or equal to about 1 mm, greater than or equal to about 2 mm, greater than or equal to about 3 mm, greater than or equal to about 4 mm, greater than or equal to about 6 mm, greater than or equal to about 8 mm, greater than or equal to about 10 mm, greater than or equal to about 12 mm, greater than or equal to about 15 mm, greater than or equal to about 20 mm, greater than or equal to about 25 mm, greater than or equal to about 30 mm, or greater than or equal to about 40 mm. In some instances, the fibers may have an average length of less than or equal to about 50 mm, less than or equal to about 40 mm, less than or equal to about 30 mm, less than or equal to about 25 mm, less than or equal to about 20 mm, less than or equal to about 15 mm, less than or equal to about 12 mm, less than or equal to about 10 mm, less than or equal to about 8 mm less than or equal to about 7 mm, less than or equal to about 5 mm, less than or equal to about 3 mm, less than or equal to about 2 mm, or less than or equal to about 1.5 mm. Combinations of the above-referenced ranges are also possible (e.g., greater than or equal to about 1 mm and less than or equal to about 50 mm, greater than or equal to about 1 mm and less than or equal to about 15 mm, greater than or equal to about 1.5 mm and less than or equal to about 30 mm,). Other values of average fiber length are also possible.

The support layer, as described herein, may have certain structural characteristics, such as basis weight, and thickness. For instance, in some embodiments, the support layer may have a basis weight of greater than or equal to about 3 $g/m^2$, greater than or equal to about 10 $g/m^2$, greater than or equal to about 22 $g/m^2$, greater than or equal to about 25 $g/m^2$, greater than or equal to about 30 $g/m^2$, greater than or equal to about 33 $g/m^2$, greater than or equal to about 40 $g/m^2$, greater than or equal to about 50 $g/m^2$, greater than or equal to about 60 $g/m^2$, greater than or equal to about 70 $g/m^2$, greater than or equal to about 80 $g/m^2$, greater than or equal to about 100 $g/m^2$, greater than or equal to about 200 $g/m^2$, greater than or equal to about 300 $g/m^2$, or greater than or equal to about 400 $g/m^2$. In some instances, the support layer may have a basis weight of less than or equal to about 500 $g/m^2$, less than or equal to about 400 $g/m^2$, less than or equal to about 300 $g/m^2$, less than or equal to about 200 $g/m^2$, less than or equal to about 100 $g/m^2$, less than or equal to about 90 $g/m^2$, less than or equal to about 80 $g/m^2$, less than or equal to about 70 $g/m^2$, less than or equal to about 60 $g/m^2$, less than or equal to about 50 $g/m^2$, less than or equal to about 40 $g/m^2$, less than or equal to about 33 $g/m^2$, less than or equal to about 30 $g/m^2$, or less than or equal to about 25 $g/m^2$. Combinations of the above-referenced ranges are also possible (e.g., a basis weight of greater than or equal to about 22 $g/m^2$ and less than or equal to about 90 $g/m^2$, a basis weight of greater than or equal to about 33 $g/m^2$ and less than or equal to about 70 $g/m^2$, a basis weight of greater than or equal to about 3 $g/m^2$ and less than or equal to about 500 $g/m^2$). Other values of basis weight are also possible. The basis weight may be determined according to the standard ASTM D-846.

The thickness of the support layer may be selected as desired. For instance, in some embodiments, the support layer may have a thickness of greater than or equal to about 0.01 mm, greater than or equal to about 0.1 mm, greater than or equal to about 0.2 mm, greater than or equal to about 0.3 mm, greater than or equal to about 0.4 mm, greater than or equal to about 0.5 mm, greater than or equal to about 1.0 mm, greater than or equal to about 1.5 mm, greater than or equal to about 2 mm, greater than or equal to about 3 mm, or greater than or equal to about 4 mm. In some instances, the support layer may have a thickness of less than or equal to about 5 mm, less than or equal to about 4 mm, less than or equal to about 3 mm, less than or equal to about 2 mm, less than or equal to about 1.2 mm, less than or equal to about 0.5 mm, less than or equal to about 0.4 mm, less than or equal to about 0.3 mm, less than or equal to about 0.2 mm, or less than or equal to about 0.1 mm. Combinations of the above-referenced ranges are also possible (e.g., a thickness of greater than or equal to about 0.01 mm and less than or equal to about 5 mm, a thickness of greater than or equal to about 0.1 mm and less than or equal to about 2 mm). Other values of thickness are also possible. The thickness may be determined according to the standard TAPPI T411.

The mean flow pore size may be selected as desired. For instance, in some embodiments, the support layer may have a mean flow pore size of greater than or equal to about 1 micron, greater than or equal to about 5 microns, greater than or equal to about 10 microns, greater than or equal to about 30 microns, greater than or equal to about 50 microns, greater than or equal to about 100 microns, greater than or equal to about 120 microns, greater than or equal to about 150 microns, greater than or equal to about 300 microns, greater than or equal to about 500 microns, greater than or equal to about 1000 microns, greater than or equal to about 2000 microns, greater than or equal to about 3000 microns, or greater than or equal to about 4000 microns. In some instances, the support layer may have an average mean flow pore size of less than or equal to about 5000 microns, less than or equal to about 4000 microns, less than or equal to about 3000 microns, less than or equal to about 2000 microns, less than or equal to about 1000 microns, less than or equal to about 500 microns, less than or equal to about 300 microns, less than or equal to about 150 microns, less than or equal to about 120 microns, less than or equal to about 100 microns, less than or equal to about 50 microns, less than or equal to about 30 microns, less than or equal to about 10 microns, or less than or equal to about 5 microns. Combinations of the above-referenced ranges are also possible (e.g., greater than or equal to about 30 microns and less than or equal to about 150 microns, greater than or equal to about 50 microns and less than or equal to about 120 microns). Other values of mean flow pore size are also possible. The mean flow pore size may be determined according to the standard ASTM E1294 (2008) (M.F.P.).

In some embodiments, the support layer may have a larger mean flow pore size than that of the fiber web.

The filter media described herein (which may optionally include two or more layers) may have certain structural characteristics such as overall basis weight. In some embodiments, the filter media may have an overall basis weight of greater than or equal to about 2 g/m$^2$, greater than or equal to about 5 g/m$^2$, greater than or equal to about 10 g/m$^2$, greater than or equal to about 20 g/m$^2$, greater than or equal to about 30 g/m$^2$, greater than or equal to about 40 g/m$^2$, greater than or equal to about 60 g/m$^2$, greater than or equal to about 100 g/m$^2$, greater than or equal to about 150 g/m$^2$, greater than or equal to about 200 g/m$^2$, greater than or equal to about 250 g/m$^2$, greater than or equal to about 350 g/m$^2$, greater than or equal to about 500 g/m$^2$, greater than or equal to about 800 g/m$^2$, greater than or equal to about 1000 g/m$^2$, greater than or equal to about 2000 g/m$^2$, greater than or equal to about 2500 g/m$^2$. In some instances, the filter media may have an overall basis weight of less than or equal to about 2800 g/m$^2$, less than or equal to about 2500 g/m$^2$, less than or equal to about 2000 g/m$^2$, less than or equal to about 1000 g/m$^2$, less than or equal to about 800 g/m$^2$, less than or equal to about 500 g/m$^2$, less than or equal to about 300 g/m$^2$, less than or equal to about 200 g/m$^2$, or less than or equal to about 100 g/m$^2$, less than or equal to about 60 g/m$^2$, less than or equal to about 40 g/m$^2$, less than or equal to about 20 g/m$^2$, less than or equal to about 10 g/m$^2$, or less than or equal to about 5 g/m$^2$. Combinations of the above-referenced ranges are also possible (e.g., greater than or equal to about 40 g/m$^2$ and less than or equal to about 2800 g/m$^2$, greater than or equal to about 60 g/m$^2$ and less than or equal to about 800 g/m$^2$). Other values of overall basis weight are also possible. The overall basis weight may be determined according to the standard ASTM D-846.

The overall air permeability of the filter media described herein can vary. In some embodiments, the overall air permeability of the filter media may be, for example, greater than or equal to about 0.7 L/m$^2$s, greater than or equal to about 1 L/m$^2$s, greater than or equal to about 5 L/m$^2$s, greater than or equal to about 10 L/m$^2$s, greater than or equal to about 15 L/m$^2$s, greater than or equal to about 25 L/m$^2$s, greater than or equal to about 50 L/m$^2$s, greater than or equal to about 100 L/m$^2$s, greater than or equal to about 150 L/m$^2$s, greater than or equal to about 200 L/m$^2$s, greater than or equal to about 250 L/m$^2$s, greater than or equal to about 300 L/m$^2$s, greater than or equal to about 500 L/m$^2$s, greater than or equal to about 700 L/m$^2$s, greater than or equal to about 1000 L/m$^2$s, or greater than or equal to about 1200 L/m$^2$s. In some instances, the overall air permeability of the filter media may be, for example, less than or equal to about 1500 L/m$^2$s, less than or equal to about 1200 L/m$^2$s, less than or equal to about 1000 L/m$^2$s, less than or equal to about 700 L/m$^2$s, less than or equal to about 500 L/m$^2$s, less than or equal to about 300 L/m$^2$s, less than or equal to about 250 L/m$^2$s, less than or equal to about 200 L/m$^2$s, less than or equal to about 150 L/m$^2$s, less than or equal to about 100 L/m$^2$s, less than or equal to about 50 L/m$^2$s, less than or equal to about 25 L/m$^2$s, less than or equal to about 20 L/m$^2$s, less than or equal to about 15 L/m$^2$s, less than or equal to about 10 L/m$^2$s, less than or equal to about 5 L/m$^2$s, or less than or equal to about 1 L/m$^2$s. Combinations of the above-referenced ranges are also possible (greater than or equal to about 0.7 L/m$^2$s and less than or equal to about 1500 L/m$^2$s, greater than or equal to about 15 L/m$^2$s and less than or equal to about 700 L/m$^2$s). Other ranges of overall air permeability are also possible. As determined herein, the overall air permeability is measured according to standard TAPPI T251 (wherein the flow is 10,000 L/m$^2$/s on 20 cm$^2$ area). The permeability of a filter media is an inverse function of flow resistance and can be measured with a Frazier Permeability Tester. The Frazier Permeability Tester measures the volume of air per unit of time that passes through a unit area of media at a fixed differential pressure across the media.

The overall thickness of the filter media may be selected as desired. For instance, in some embodiments, the filter media may have an overall thickness of greater than or equal to about 0.1 mm, greater than or equal to about 0.2 mm, greater than or equal to about 0.3 mm, greater than or equal to about 0.4 mm, greater than or equal to about 0.5 mm, greater than or equal to about 1.0 mm, greater than or equal to about 1.5 mm, greater than or equal to about 2 mm, greater than or equal to about 5 mm, greater than or equal to about 10 mm, greater than or equal to about 20 mm, greater than or equal to about 30 mm, or greater than or equal to about 40 mm. In some instances, the filter media may have an overall thickness of less than or equal to about 50 mm, less than or equal to about 40 mm, less than or equal to about 30 mm, less than or equal to about 20 mm, less than or equal to about 10 mm, less than or equal to about 5 mm, less than or equal to about 2.0 mm, less than or equal to about 1.2 mm, less than or equal to about 0.5 mm, less than or equal to about 0.4 mm, less than or equal to about 0.3 mm, or less than or equal to about 0.2 mm. Combinations of the above-referenced ranges are also possible (e.g., a thickness of greater than or equal to about 0.01 mm and less than or equal to about 50 mm, a thickness of greater than or equal to about 0.1 mm and less than or equal to about 30 mm). Other values of overall thickness are also possible. The thickness may be determined according to the standard TAPPI T411.

The filter media, filter element, fiber web and/or support layer may also include other components, such as a binder resin, surface treatments, and/or additives. In general, any suitable binder resin may be used to achieve the desired properties. For example, the binder resin may be polymeric, water-based, or solvent-based. In certain embodiments, the binder resin may also include additives.

In some embodiments, the fiber web and/or the support layer of a filter media described herein include a binder resin. Typically, a binder resin or any additional components, if present, are present in limited amounts. In some embodiments, the fiber web and/or the support layer may include wet and/or dry strength binder resins that include, for example, natural polymers (starches, gums), cellulose derivatives, such as carboxymethyl cellulose, methylcellulose, hemicelluloses, synthetic polymers such as phenolics, latexes, polyamides, polyacrylamides, urea-formaldehyde, melamine-formaldehyde, polyamides), surfactants, coupling agents, crosslinking agents, and/or conductive additives, amongst others. In some embodiments, the binder resin may comprise a thermoplastic (e.g., acrylic, polyvinylacetate, polyester, polyamide), a thermoset (e.g., epoxy, phenolic resin), or a combination thereof. In some cases, a binder resin includes one or more of a vinyl acetate resin, an epoxy resin, a polyester resin, a copolyester resin, a polyvinyl alcohol resin, an acrylic resin such as a styrene acrylic resin, and a phenolic resin. Other binder resins are also possible.

The binder resin is generally not in fiber form and is to be distinguished from binder fiber (e.g., multi-component fiber) described above. In general, the binder resin may have any suitable composition.

The amount of binder resin in the fiber web and/or support layer may vary. For instance, in some embodiments, the weight percentage of binder resin in the fiber web may be greater than or equal to about 0 wt %, greater than or equal to about 2 wt %, greater than or equal to about 5 wt %, greater than or equal to about 10 wt %, or greater than or equal to about 15 wt %. In some cases, the weight percentage of binder resin in the fiber web may be less than or equal to about 20 wt %, less than or equal to about 15 wt %, less than or equal to about 10 wt %, less than or equal to about 5 wt %, or less than or equal to about 2 wt %. Combinations of the above-referenced ranges are also possible (e.g., a weight percentage of binder resin of greater than or equal to about 0 wt % and less than or equal to about 20 wt %, a weight percentage of binder resin of greater than or equal to about 2 wt % and less than or equal to about 15 wt %). Other ranges are also possible.

The binder resin may be added to the fibers in any suitable manner including, for example, in the wet state. In some embodiments, the binder resin coats the fibers and is used to adhere fibers to each other to facilitate adhesion between the fibers. Any suitable method and equipment may be used to coat the fibers, and are described in the context of coating methods above.

In some embodiments, a binder resin may be added to the fiber web and/or one or more additional layers by a solvent saturation process. In certain embodiments, a polymeric material can be impregnated into filter medium either during or after the filter medium is being manufactured on a papermaking machine. For example, after the fiber web is formed, it can be impregnated with a polymeric material by using a reverse roll applicator following the just-mentioned method and/or by using a dip and squeeze method (e.g., by dipping a dried filter media into a polymer emulsion or solution and then squeezing out the excess polymer by using a nip). A polymeric material can also be applied to the fiber web and/or one or more additional layers by other methods known in the art, such as spraying or foaming. p Fiber webs and/or one or more additional layers for incorporation into a filter media, as described herein, may be produced using any suitable processes, such as using a wet laid process (e.g., a process involving a pressure former, a rotoformer, a fourdrinier, a hybrid former, inclined wire, or a twin wire process) or a non-wet laid process (e.g., a dry laid process, an air laid process, a meltblown process). In general, a wet laid process involves mixing together of fibers of one or more type to provide a fiber slurry. The slurry may be, for example, an aqueous-based slurry. In certain embodiments, the various fibers are optionally stored separately, or in combination, in various holding tanks prior to being mixed together (e.g., to achieve a greater degree of uniformity in the mixture).

For instance, a first fiber may be mixed and pulped together in one container and a second fiber may be mixed and pulped in a separate container. The first fibers and the second fibers may subsequently be combined together into a single fibrous mixture. Appropriate fibers may be processed through a pulper before and/or after being mixed together. In some embodiments, combinations of fibers are processed through a pulper and/or a holding tank prior to being mixed together. It can be appreciated that other components may also be introduced into the mixture.

Any suitable method for creating a fiber slurry may be used. In some embodiments, further additives are added to the slurry to facilitate processing. The temperature may also be adjusted to a suitable range, for example, between 33° F. and 100° F. (e.g., between 50° F. and 85° F.). In some cases, the temperature of the slurry is maintained. In some instances, the temperature is not actively adjusted.

In some embodiments, the wet laid process uses similar equipment as in a conventional papermaking process, for example, a hydropulper, a former or a headbox, a dryer, and an optional converter. A layer can also be made with a laboratory handsheet mold in some instances. As discussed above, the slurry may be prepared in one or more pulpers. After appropriately mixing the slurry in a pulper, the slurry may be pumped into a headbox where the slurry may or may not be combined with other slurries. Other additives may or may not be added. The slurry may also be diluted with additional water such that the final concentration of fiber is in a suitable range, such as for example, between about 0.01% to 0.5% by weight, or between about 0.1% and 0.5% by weight.

In some cases, the pH of the fiber slurry may be adjusted as desired. For instance, fibers of the slurry may be dispersed under generally neutral conditions.

Before the slurry is sent to a headbox, the slurry may optionally be passed through centrifugal cleaners and/or pressure screens for removing unfiberized material. The slurry may or may not be passed through additional equipment such as refiners or deflakers to further enhance the dispersion or fibrillation of the fibers. For example, deflakers may be useful to smooth out or remove lumps or protrusions that may arise at any point during formation of the fiber slurry. Fibers may then be collected on to a screen or wire at an appropriate rate using any suitable equipment, e.g., a fourdrinier, a rotoformer, a cylinder, or an inclined wire fourdrinier.

In some embodiments, the process involves introducing a binder (and/or other components) into a pre-formed fiber layer. In some embodiments, as the fiber web is passed along an appropriate screen or wire, different components included in the binder, which may be in the form of separate emulsions, are added to the fiber web using a suitable technique. In some cases, each component of the binder resin is mixed as an emulsion prior to being combined with the other components and/or fiber web. In some embodiments, the components included in the binder may be pulled through the fiber web using, for example, gravity and/or vacuum. In some embodiments, one or more of the components included in the binder resin may be diluted with softened water and pumped into the fiber web. In some embodiments, a binder may be introduced to the fiber web by spraying onto the formed media, or by any other suitable method, such as for example, size press application, foam saturation, curtain coating, rod coating, amongst others. In some embodiments, a binder material may be applied to a fiber slurry prior to introducing the slurry into a headbox. For example, the binder material may be introduced (e.g., injected) into the fiber slurry and impregnated with and/or precipitated on to the fibers. In some embodiments, a binder resin may be added to a fiber web by a solvent saturation process.

In other embodiments, a non-wet laid process is used to form fiber web (or one or more additional layers) of a media. For example, in a non-wet laid process, an air laid process or a carding process may be used. For example, in an air laid process, fibers may be mixed while air is blown onto a conveyor, and a binder is then applied. In a carding process, in some embodiments, the fibers are manipulated by rollers and extensions (e.g., hooks, needles) associated with the rollers prior to application of the binder. In some cases, forming the layers through a non-wet laid process may be more suitable for the production of a highly porous media. The non-wet layer may be impregnated (e.g., via saturation, spraying, etc.) with any suitable binder resin, as discussed above.

During or after formation of a fiber web, the fiber web may be further processed according to a variety of known techniques. Optionally, additional layers can be formed and/or added to a fiber web using processes such as lamination, thermo-dot bonding, ultrasonic, calendering, glue-web, co-pleating, or collation.

In some embodiments, further processing may involve pleating the fiber web and/or the filter media. For instance, two layers may be joined by a co-pleating process. In some cases, the filter media, or various layers thereof, may be suitably pleated by forming score lines at appropriately spaced distances apart from one another, allowing the filter media to be folded. It should be appreciated that any suitable pleating technique may be used.

In some embodiments, a filter media can be post-processed such as subjected to a corrugation process to increase surface area within the web. In other embodiments, a filter media may be embossed.

In some embodiments, as described herein, a fiber web (or one or more additional layers) may include fibers formed from a meltblown process. In embodiments in which the filter media includes a meltblown layer, the meltblown layer may have one or more characteristics described in commonly-owned U.S. Patent Publication No. 2009/0120048, entitled "Meltblown Filter Medium", which is based on U.S. patent application Ser. No. 12/266,892, filed on May 14, 2009, and commonly-owned U.S. application Ser. No. 12/971,539, entitled "Fine Fiber Filter Media and Processes", filed on Dec. 17, 2010, each of which is incorporated herein by reference in its entirety for all purposes. In other embodiments, a fiber web may be formed via other suitable processes such as meltspun processes.

The filter media described herein can be incorporated into a variety of filter elements for use in various applications. In some cases, filter media described herein can be used as filter media for coalescing applications (e.g., using a wrapped filter). For example, such filter media may be used to remove oil from a gas stream (e.g., a compressed air stream).

In some embodiments, the filter media described herein can be incorporated into a filter element used in hydraulic and/or non-hydraulic filtration applications. Exemplary uses of hydraulic filters (e.g., high-, medium-, and low-pressure specialty filters) include mobile and industrial filters. Exemplary uses of non-hydraulic filters include fuel filters (e.g., ultra-low sulfur diesel), oil filters (e.g., lube oil filters or heavy duty lube oil filters), chemical processing filters, industrial processing filters, medical filters (e.g., filters for blood), air filters (e.g., heavy duty air filters, automotive air filters, HVAC filters, HEPA filters), and water filters. In some embodiments, an external support layer substantially supports the filter element, such that an additional support layer and/or a core (e.g., a plastic or metallic net, or wire mesh), is absent from the filter media or filter element. In other embodiments, the filter element may comprise one or more additional support layers and/or cores. In some embodiments, a fiber web of filter media may be wrapped around a core (e.g., a synthetic or metal core) to form a wrapped filter, as described herein. The filter elements may have the same property values as those noted above in connection with the filter media. For example, the above-noted basis weights, efficiencies of the filter media may also be found in filter elements.

In some embodiments, as described herein, the fiber webs, filter media, and/or filter elements described herein may be useful in a system comprising a device for generating an gas stream. For example, in certain embodiments, the system may comprise the device for generating an gas stream, and the filter media or filter element positioned downstream of the device. In certain embodiments, the gas stream comprises a fluid to be filtered out of the gas stream, such as an oil, lubricant, and/or cooling agent as described herein.

Non-limiting examples of devices for generating an gas stream comprising oil, lubricant, and/or cooling agent include compressors, distillation columns, evaporators, thermal oil ventilators, crankcase ventilators, combustion engines, exhaust conduits, turbines (e.g., gas turbines), and combinations thereof.

The filter media and filter elements described herein may be useful for preventing fouling caused by oil, lubricants, cooling agents, and/or other fluids in such systems and devices, including but not limited to, for example, compressors, gas turbines, amine or glycol absorbers, molecular sieves, PSA's, metering stations, mercury guard beds, gas fired heaters or furnaces, heat exchangers and/or gas-gas purification membranes. The filter media and filter elements may also be useful in applications utilizing gas streams comprising an oil, lubricant, and/or cooling agent including, but not limited to, for example: natural gas production; blow off gases in the oil and mining industry containing suspended liquids; gasses from downstream sides of distillation columns; separation of droplets of steam that carried from evaporators; thermal oil ventilation; crankcase ventilation in cars or other combustions engines (e.g., piston or rotary type engines); exhaust fumes in general; excess gasses from chemical industry; cooling and condensing exhaust fumes from power plants; fog removal in general; blow off gasses from oil fog lubricated fast rotating machinery; fog generated by the cooling and lubricant liquids from mills, lathes, grinders and other type of machines using regular or irregular shaped cutting edges; facemasks (e.g., for personal protection against short time exposure to oil fog); fog generated by evaporating oil in continuous rolling mills; acetylene torch cutting; plasma cutting; electron beam cutting and all kinds of electrical arc welding and cutting; presses (e.g., high speed presses) and die cutters and die forges; downstream of pumps; downstream and/or upstream of vacuum blowers in general; paint or oil spray cabin exhaust air treatment; mixing chambers for liquids; evaporation cooler exhaust air; dry tower exhaust air (e.g., milk powder or similar products containing oily or fatty substance); process gasses for welding or cutting; medical applications; food industry process air; pressurized air controlled control systems; gasses transported in the industry for liquefying gases (e.g., nitrogen, carbon dioxide); inside air conditioning (e.g., HVAC) units to remove droplets from the cooling agent from the gas stream; and heat pipes (e.g., to avoid unwanted transport of the heat transport liquid from the condenser to the evaporator).

In an exemplary embodiment, a filter element comprises a stainless steel mesh core, two or more fiber webs layers wrapped around the mesh core, and a fibrous support layer comprising synthetic fibers wrapped around the fiber web layers. In another exemplary embodiment, the filter element comprises a two or more fiber web layers wrapped around a fibrous core, and a support layer comprising synthetic fibers wrapped around the two or more fiber web layers. In yet another exemplary embodiment, the filter element comprises two or more fiber web layers wrapped around a perforated metal sheet core.

In some embodiments, an inlet may be disposed within the core, such that a gas stream comprising an oil, lubricant, and/or cooling agent passes into the core, through the filter media including the fiber web layers and support layer(s), and subsequently into an outlet positioned proximate the outer-most layer of the filter media, such that the filter element has coalesced at least a portion of the oil, lubricant, and/or cooling agent.

In another exemplary embodiment, the filter element comprises two or more fiber web wrapped layers disposed within a perforated sheet metal core. In some such embodiments, an inlet of the filter element may be positioned proximate the external perforated sheet metal core, such that a gas stream comprising an oil, lubricant, and/or cooling agent passes through the core into the fiber web layers and subsequently into an outlet disposed within the filter element, such that the filter element has coalesced at least a portion of the oil, lubricant, and/or cooling agent.

Other configurations and combinations of cores, support layers, and fiber webs are also possible.

Other systems, devices, and applications are also possible and those skilled in the art would be capable of selecting such systems, devices, and applications based upon the teachings of this specification.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention. The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in some embodiments, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in some embodiments, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The term "alkane" is given its ordinary meaning in the art and refers to a saturated hydrocarbon molecule.

The term "amine" is given its ordinary meaning in the art and refers to a primary ($-NH_2$), secondary ($-NHR_x$), tertiary ($-NR_xR_y$), or quaternary ($-N^+R_xR_yR_z$) amine (e.g., where $R_x$, $R_y$, and $R_z$ are independently an aliphatic, alicyclic, alkyl, aryl, or other moieties, as defined herein).

The term "amide" is given its ordinary meaning in the art and refers to a compound containing a nitrogen atom and a carbonyl group of the structure $R_xCONR_yR_z$ (e.g., where $R_x$, $R_y$, and $R_z$ are independently an aliphatic, alicyclic, alkyl, aryl, or other moieties, as defined herein).

Any terms as used herein related to shape, orientation, alignment, and/or geometric relationship of or between, for example, one or more articles, structures, forces, fields, flows, directions/trajectories, and/or subcomponents thereof and/or combinations thereof and/or any other tangible or intangible elements not listed above amenable to characterization by such terms, unless otherwise defined or indicated, shall be understood to not require absolute conformance to a mathematical definition of such term, but, rather, shall be understood to indicate conformance to the mathematical definition of such term to the extent possible for the subject matter so characterized as would be understood by one skilled in the art most closely related to such subject matter. Examples of such terms related to shape, orientation, and/or geometric relationship include, but are not limited to terms descriptive of: shape—such as, round, square, circular/circle, rectangular/rectangle, triangular/triangle, cylindrical/cylinder, elliptical/ellipse, (n)polygonal/(n)polygon, etc.; angular orientation—such as perpendicular, orthogonal, parallel, vertical, horizontal, collinear, etc.; contour and/or trajectory—such as, plane/planar, coplanar, hemispherical, semi-hemispherical, line/linear, hyperbolic, parabolic, flat, curved, straight, arcuate, sinusoidal, tangent/tangential, etc.; direction—such as, north, south, east, west, etc.; surface and/or bulk material properties and/or spatial/temporal resolution and/or distribution—such as, smooth, reflective, transparent, clear, opaque, rigid, impermeable, uniform(ly), inert, non-wettable, insoluble, steady, invariant, constant, homogeneous, etc.; as well as many others that would be apparent to those skilled in the relevant arts. As one example, a fabricated article that would described herein as being " square" would not require such article to have faces or sides that are perfectly planar or linear and that intersect at angles of exactly 90 degrees (indeed, such an article can only exist as a mathematical abstraction), but rather, the shape of such article should be interpreted as approximating a " square," as defined mathematically, to an extent typically achievable and achieved for the recited fabrication technique as would be understood by those skilled in the art or as specifically described. As another example, two or more fabricated articles that would described herein as being " aligned" would not require such articles to have faces or sides that are perfectly aligned (indeed, such an article can only exist as a mathematical abstraction), but rather, the arrangement of such articles should be interpreted as approximating "aligned," as defined mathematically, to an extent typically achievable and achieved for the recited fabrication technique as would be understood by those skilled in the art or as specifically described.

What is claimed is:

1. A method for filtering an oil, lubricant, and/or cooling agent from a gas stream, the method comprising:
    passing the gas stream including the oil, lubricant, and/or cooling agent through a filter element, wherein the filter element comprises a fiber web wrapped around a core such that at least two layers of the fiber web are formed, the fiber web comprising:
    a plurality of fibers having an average fiber diameter of at least 0.01 microns and less than or equal to 50 microns;
    a basis weight of at least 1 g/m$^2$ and less than or equal to 270 g/m$^2$; and
    a thickness of at least 0.01 mm and less than or equal to 5.0 mm,
    wherein the fiber web has an oil repellency level of between 4 and 6;
    wherein the fiber web has an oil carry over of less than 20%, and
    wherein the oil, lubricant, and/or cooling agent has a surface tension of between 22 mN/m and 33 mN/m measured at 23° C. and 50% RH.

2. The method of claim 1, wherein the gas stream is generated by a compressor, natural gas production equipment, a distillation column, an evaporator, a thermal oil ventilator, a crankcase ventilator, a combustion engine, and/or an exhaust conduit.

3. The method of claim 1, wherein the fiber web comprises binder fibers, wherein a weight percentage of binder fibers present in the fiber web is at least about 0 wt % and less than or equal to about 10 wt %.

4. The method of claim 1, wherein the fiber web comprises glass fibers, wherein the weight percentage of glass fibers present in the fiber web is greater than or equal to about 0% and less than or equal to about 99% by weight of the total fibers in the fiber web.

5. The method of claim 1, wherein the fiber web comprises synthetic fibers, wherein the weight percentage of synthetic fibers present in the fiber web is greater than or equal to about 1% and less than or equal to about 100% by weight of the total fibers in the fiber web.

6. The method of claim 1, wherein the fiber web comprises cellulose fibers, wherein the weight percentage of cellulose fibers present in the fiber web is greater than or equal to about 1% and less than or equal to about 100% by weight of the total fibers in the fiber web.

7. The method of claim 1, wherein the fiber web has at least one modified surface.

8. The method of claim 1, wherein the fiber web has an initial efficiency of greater than or equal to about 1% and less than or equal to about 99.99%.

9. The method of claim 1, wherein at least one surface of the fiber web is coated with a coating.

10. The method of claim 9, wherein the coating comprises a fluorinated polymer.

* * * * *